US012062475B2

(12) United States Patent
Tsukahara et al.

(10) Patent No.: US 12,062,475 B2
(45) Date of Patent: Aug. 13, 2024

(54) SOFT MAGNETIC ALLOY, SOFT MAGNETIC ALLOY RIBBON, SOFT MAGNETIC POWDER, AND MAGNETIC COMPONENT

(71) Applicant: TDK CORPORATION, Tokyo (JP)

(72) Inventors: Takuya Tsukahara, Tokyo (JP); Isao Nakahata, Tokyo (JP); Kazuhiro Yoshidome, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/702,972

(22) Filed: Mar. 24, 2022

(65) Prior Publication Data

US 2022/0328224 A1 Oct. 13, 2022

(30) Foreign Application Priority Data

Mar. 31, 2021 (JP) ................................ 2021-061005
Dec. 24, 2021 (JP) ................................ 2021-211032

(51) Int. Cl.

*C22C 38/16* (2006.01)
*C22C 38/02* (2006.01)
*C22C 38/12* (2006.01)
*C22C 45/02* (2006.01)
*H01F 1/153* (2006.01)

(52) U.S. Cl.

CPC ......... *H01F 1/15333* (2013.01); *C22C 38/02* (2013.01); *C22C 38/12* (2013.01); *C22C 38/16* (2013.01); *C22C 45/02* (2013.01); *C22C 2200/02* (2013.01); *C22C 2202/02* (2013.01)

(58) Field of Classification Search

CPC . C22C 2200/02; C22C 2202/02; C22C 38/02; C22C 38/12; C22C 38/16; C22C 45/02; H01F 1/15333
USPC .......................................................... 420/89
See application file for complete search history.

(56) References Cited

U.S. PATENT DOCUMENTS

2018/0154434 A1 6/2018 Henmi et al.
2019/0237229 A1* 8/2019 Yoshidome ............ C21D 6/008
2021/0301377 A1* 9/2021 Yoshidome ............ C22C 38/12

FOREIGN PATENT DOCUMENTS

JP 2006079757 A * 3/2006
JP 6482718 B1 3/2019

OTHER PUBLICATIONS

NPL: on-line translation of JP-2006079757-A,—Mar. 2006 (Year: 2006).*

* cited by examiner

*Primary Examiner* — Jie Yang
(74) *Attorney, Agent, or Firm* — Oliff PLC

(57) ABSTRACT

To provide a soft magnetic alloy or the like, from which a magnetic component having a good temperature property of core loss can be obtained. The soft magnetic alloy includes Fe. The soft magnetic alloy includes a crystallite, and an amorphous phase existing around the crystallite. A total area ratio of the crystallite in a cross section of the soft magnetic alloy is 40% or more and less than 60%. An average thickness of the amorphous phase is 3.0 nm or more and 10.0 nm or less. A standard deviation of a thickness of the amorphous phase is 10.0 nm or less.

10 Claims, 4 Drawing Sheets

SOFT MAGNETIC ALLOY, SOFT MAGNETIC ALLOY RIBBON, SOFT MAGNETIC POWDER, AND MAGNETIC COMPONENT

BACKGROUND OF THE INVENTION

The present invention relates to a soft magnetic alloy, a soft magnetic alloy ribbon, a soft magnetic powder, and a magnetic component.

Patent Document 1 discloses a soft magnetic alloy in which both a crystal grain size of nanocrystals and an average thickness of amorphous phases are within specific ranges, an average Fe concentration in the amorphous phases near a surface of the nanocrystals is lower than an average Fe concentration in the nanocrystals, and a crystallinity is high.

[Patent Document 1] Japanese Patent No. 6482718

BRIEF SUMMARY OF INVENTION

An object of the present invention is to provide a soft magnetic alloy or the like capable of obtaining a magnetic component having a good temperature property of core loss.

In order to achieve the above object, a soft magnetic alloy according to the present invention is

- a soft magnetic alloy including Fe, wherein
- the soft magnetic alloy includes a crystallite, and an amorphous phase existing around the crystallite,
- a total area ratio of the crystallite in a cross section of the soft magnetic alloy is 40% or more and less than 60%, and
- an average thickness of the amorphous phase is 3.0 nm or more and 10.0 nm or less, and a standard deviation of a thickness of the amorphous phase is 10.0 nm or less.

An average grain size of the crystallite may be 15.0 nm or less.

The soft magnetic alloy may further include M, wherein M may be one or more of Nb, Hf, Zr, Ta, Mo, V, Ti, and W.

A total content of M may be 3.5 at % or more and 10.0 at % or less.

The soft magnetic alloy may further include P, and P content may be more than 0 and 6.0 at % or less.

The soft magnetic alloy may further include Cu, and Cu content may be more than 0 and 3.0 at % or less.

The soft magnetic alloy may further include Co, and Co content may be more than 0 and equal to or less than Fe content.

A soft magnetic alloy ribbon according to the present invention includes the above soft magnetic alloy.

A soft magnetic alloy powder according to the present invention includes the above soft magnetic alloy.

A first magnetic component according to the present invention includes the above soft magnetic alloy ribbon which is laminated.

A second magnetic component according to the present invention includes the above soft magnetic alloy ribbon which is wound.

A third magnetic component according to the present invention includes the above soft magnetic alloy powder.

DETAILED DESCRIPTION OF INVENTION

Figure 1:
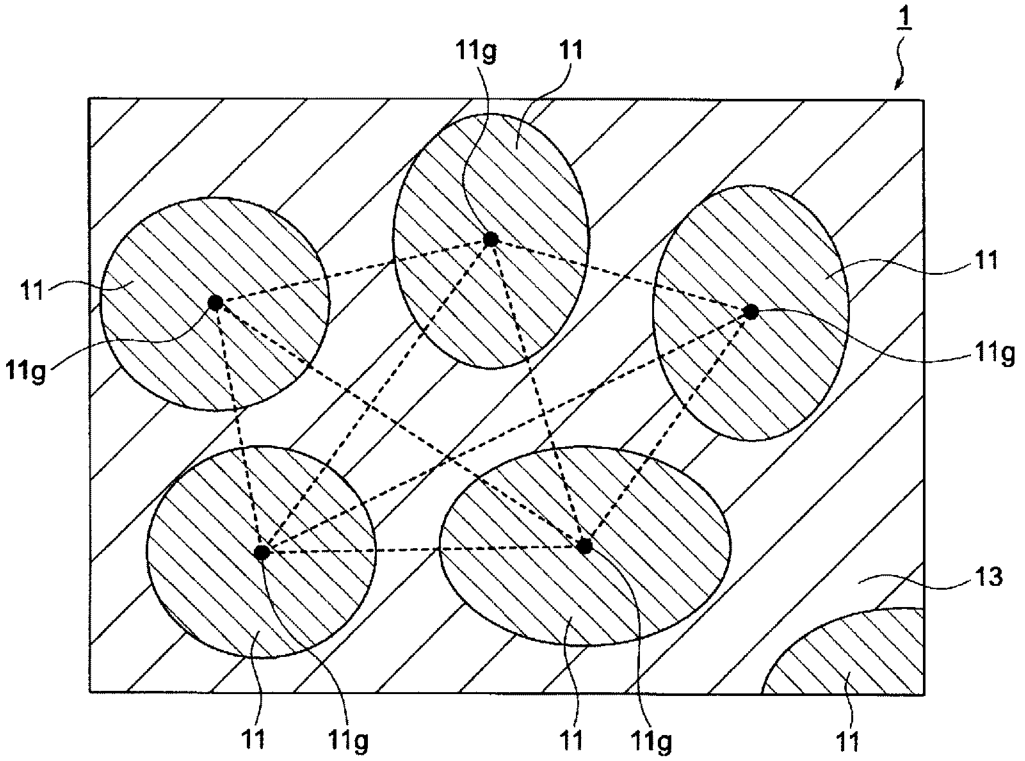
FIG. 1 is a schematic diagram of a soft magnetic alloy.

Hereinafter, embodiments of the present invention will be described with reference to drawings.

A soft magnetic alloy according to the present embodiment is

- a soft magnetic alloy that includes Fe,
- the soft magnetic alloy includes a crystallite, and an amorphous phase existing around the crystallite,
- a total area ratio of the crystallite in a cross section of the soft magnetic alloy is 40% or more and less than 60%, and
- an average thickness of the amorphous phase is 3.0 nm or more and 10.0 nm or less, and a standard deviation of a thickness of the amorphous phase is 10.0 nm or less.

Since the soft magnetic alloy according to the present embodiment has the above configuration, a temperature property can be evaluated as good. In particular, a temperature property of a soft magnetic alloy ribbon including the above soft magnetic alloy and a temperature property of a magnetic component including the soft magnetic alloy ribbon can be evaluated as good.

In the related art, a soft magnetic alloy including a crystallite and an amorphous phase existing around the crystallite has been known. Further, it has been known that a magnetic anisotropy of the crystallite changes depending on a temperature change of the soft magnetic alloy.

The present inventors have found that the temperature property is improved by controlling the total area ratio of the crystallite, the average thickness of the amorphous phase, and the standard deviation of the thickness of the amorphous phase within the above specific ranges. The change in an effective magnetic anisotropy due to the temperature change is canceled by controlling each of the above parameters within the above specific range, so that the temperature property is improved.

Hereinafter, a method for measuring each of the above parameters will be described.

In the present embodiment, each of the above parameters is calculated based on an image obtained by observing the soft magnetic alloy. A transmission electron microscope (TEM) is used for observing the soft magnetic alloy. Hereinafter, a method using TEM will be described.

An evaluation method when the TEM is used is not particularly limited. For example, a bright field microscopy and a high resolution microscopy can be mentioned.

In the present embodiment, in order to accurately evaluate a shape of the crystallite, a thickness of a sample used for observation by the TEM (hereinafter, simply referred to as a TEM sample) is made smaller than usual. Specifically, a thickness of a normal TEM sample is about 80 nm to 100 nm, whereas in the present embodiment, the thickness of the TEM sample is 20 nm or less. A method for preparing the above TEM sample is not particularly limited, but for example, the TEM sample can be prepared using a focused ion beam-scanning electron microscope (FIB-SEM). When the TEM sample is prepared using the soft magnetic alloy ribbon, one of surfaces perpendicular to a thickness direction of the soft magnetic alloy ribbon is polished to prepare the TEM sample.

When the TEM sample is thick, the total area ratio of the crystallite may appear larger than that when the TEM sample is thin. In addition, when the TEM sample is thick, a plurality of crystallites may overlap in the thickness direction and appear as one crystallite. In this case, the thickness of the amorphous phase cannot be evaluated accurately. In the present embodiment, each of the above parameters can be accurately evaluated by reducing the thickness of the TEM sample. In addition, the thickness of the TEM sample may be evaluated by using a convergent-beam electron diffraction (CBED) method or an electron energy-loss spectroscopy (EELS) method, or may be evaluated by directly observing the TEM sample.

A size and a magnification of the image obtained by the TEM are not particularly limited. The size of the image may be a size that completely includes 10 or more crystallites, and is preferably a size that completely includes 30 or more crystallites. The magnification of the image obtained by the TEM may be any magnification as long as each of the above parameters can be measured. Specifically, the magnification is about 100,000 to 1,000,000 times.

Figure 2:
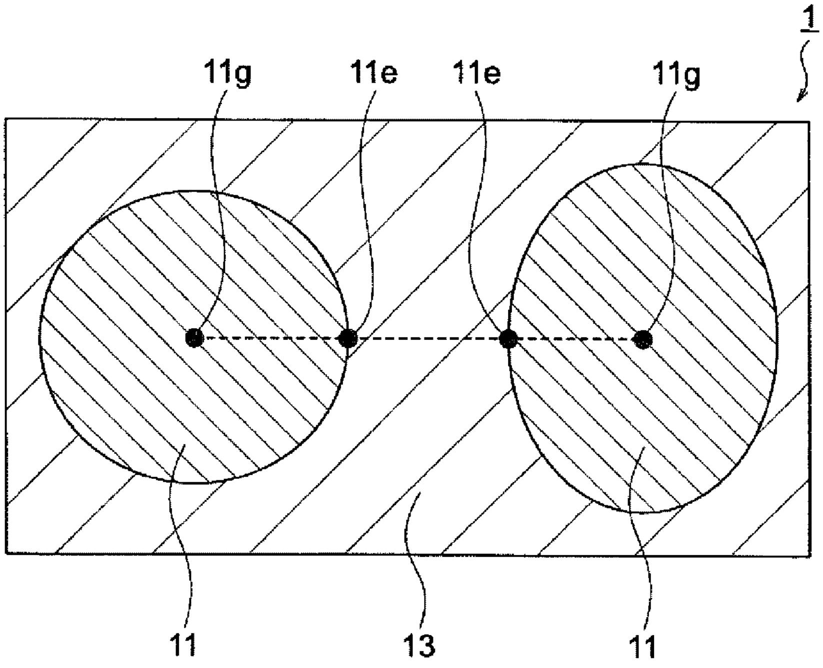
FIG. 2 is a schematic diagram of the soft magnetic alloy.

As illustrated in FIG. 1, a crystallite 11, and an amorphous phase 13 existing around the crystallite 11 are included in a soft magnetic alloy 1. FIG. 1 and FIG. 2 to be described below are schematic diagrams for explaining the method for measuring each of the above parameters. FIG. 1 and FIG. 2 to be described below do not reflect an actual shape of the crystallite 11 and an actual shape of the amorphous phase 13.

A ratio of a total area of the crystallite 11 to an area of the image is the total area ratio of the crystallite.

Hereinafter, a thickness of the amorphous phase 13 will be described. When the thickness of the amorphous phase 13 is calculated, only the thickness of the amorphous phase 13 between the crystallites 11 which can be observed as a whole is calculated. In FIG. 1, the thickness of the amorphous phase 13 between the crystallite 11 on a lower right and another crystallite 11 is not calculated. This is because the crystallite 11 on the lower right is not entirely included in the image.

A centroid 11*g* is calculated for each crystallite 11 that can be observed as a whole. A virtual line connecting two centroids 11*g* included in any two crystallites 11 is drawn. However, when the virtual line connecting the two centroids 11*g* passes through the crystallite 11 (including the crystallite 11 that cannot be observed as a whole) other than the two crystallites 11, the virtual line is not drawn.

In FIG. 1, regarding each crystallite 11 that can be observed as a whole, a virtual line connecting the crystallite 11 on an upper left and the crystallite 11 on an upper right is not drawn. This is because when the virtual line is drawn, the virtual line passes through the crystallite 11 located between the crystallite 11 on the upper left and the crystallite 11 on the upper right. On the contrary, regarding each crystallite 11 that can be observed as a whole, for combinations of two crystallites 11 other than a combination of the crystallite 11 on the upper left and the crystallite 11 on the upper right, a virtual line connecting the two crystallites 11 is drawn. This is because, as shown in FIG. 1, even if a virtual line is drawn, the virtual line does not pass through a crystallite 11 other than the two crystallites 11.

FIG. 2 illustrates two crystallites 11 included in the soft magnetic alloy 1 and connected by a virtual line. Points where the virtual line and outer circumferences of the two crystallites 11 intersect are defined as end points 11*e*. A length of a line segment on the virtual line connecting the end points 11*e* is defined as the thickness of the amorphous phase 13 between the two crystallites 11.

The thickness of the amorphous phase 13 is calculated for all the virtual lines included in the image. Then, an average thickness of the amorphous phases 13 is calculated by averaging the thicknesses of all the amorphous phases 13. Further, a standard deviation of the thicknesses of all the amorphous phases 13 included in the image is calculated based on the thicknesses of all the amorphous phases 13 included in the image.

Specifically, the number of virtual lines, that is, the number of thicknesses is n, the thickness of each amorphous phase is $x_1, x_2, \ldots, x_n$, and the average thickness of the amorphous phase 13 is μ, and μ is calculated by the following formula.

$$\mu = \frac{1}{n}\sum_{i=1}^{n} x_i \quad \text{[Math. 1]}$$

At this time, a population variance $\sigma^2$ of the thickness of the amorphous phase 13 is calculated by the following formula.

$$\sigma^2 = \frac{1}{n}\sum_{i=1}^{n} (x_i - \mu)^2 \quad \text{[Math. 2]}$$

A positive square root of $\sigma^2$ is a standard deviation σ of the thickness of the amorphous phase 13.

A kind of the crystallite 11 according to the present embodiment is not particularly limited. The crystallite 11 may be a nano-sized crystal including α-Fe as a main component. Specifically, the crystallite 11 may include only the α-Fe, and the crystallite 11 may include one or more of X1, X2, M, B, P, Si, and Cu to be described below in addition to the above α-Fe. For example, the crystallite 11 may include Si and/or Co. A content of one or more of X1, X2, M, B, P, Si, and Cu in the crystallite 11 is not particularly limited. In addition, it is preferable that an average grain size of the crystallite 11 is 15 nm or less. This is because when the average grain size of the crystallite 11 is small, a variation of the effective magnetic anisotropy due to the temperature change is reduced and the temperature property is improved.

Compositions of the soft magnetic alloy according to the present embodiment are not particularly limited except for including Fe.

The soft magnetic alloy according to the present embodiment may further include M. M is one or more of Nb, Hf, Zr, Ta, Mo, V, Ti, and W. M may be one or more of Nb, Hf, Zr, Ta, Mo, V, and W. When the soft magnetic alloy includes M, the temperature property is easily improved.

A total content of M may be 0 or more and 10.0 at % or less, may be more than 0 and 10.0 at % or less, and may be 3.5 at % or more and 10.0 at % or less. The smaller the M content is, the easier it is for a grain size of the crystallite 11 to increase. When the grain size of the crystallite 11 increases, the effective magnetic anisotropy tends to increase, and the temperature property tends to deteriorate. When the M content exceeds 10.0 at %, the thickness of the amorphous phase 13 tends to increase, and the average thickness of the amorphous phase tends to exceed 10.0 nm. When the average thickness of the amorphous phase exceeds 10.0 nm, the temperature property deteriorates.

The soft magnetic alloy according to the present embodiment may further include P. P content may be more than 0 and 6.0 at % or less. When the P content is within the above range, a composition of the amorphous phase 13 can be suitably and easily controlled, and the average thickness of the amorphous phase 13 and a standard deviation of the thickness of the amorphous phase 13 can be easily controlled within the above ranges.

The soft magnetic alloy according to the present embodiment may further include Cu. Cu content may be more than 0 and 3.0 at % or less. When the Cu content is within the above range, crystals tend to grow evenly when the crystallite 11 is generated in the soft magnetic alloy. As a result, the average thickness of the amorphous phase 13 and the standard deviation of the thickness of the amorphous phase 13 can be easily controlled within the above range.

The soft magnetic alloy according to the present embodiment may further include Co. Co content may be more than 0 and equal to or less than Fe content. Specifically, a value obtained by dividing the Co content by the Fe content may be more than 0 and 1.0 or less. Since the soft magnetic alloy includes Co, a property can be improved without changing a fine structure of the soft magnetic alloy.

The compositions of the soft magnetic alloy according to the present embodiment will be described in more detail. The soft magnetic alloy according to the present embodiment may be a soft magnetic alloy including a main component having a compositional formula $$(Fe_{(1-(\alpha+\beta))}X1_{\alpha}X2_{\beta})_{(1-(a+b+c+d+e))}M_aB_bP_cSi_dCu_e$$

(atomic number ratio), wherein

X1 represents one or more of Co and Ni,

X2 represents one or more of Al, Mn, Ag, Zn, Sn, As, Sb, Cr, Ga, Bi, N, O, C, S, and a rare earth element, M represents one or more of Nb, Hf, Zr, Ta, Mo, V, Ti, and W, and $0 \le a \le 0.1500$, $0 \le b \le 0.2000$, $0 \le c \le 0.2000$, $0 \le d \le 0.2000$, $0 \le e \le 0.0400$, $0.7000 \le 1-(a+b+c+d+e) \le 0.9000$ $\alpha \ge 0$, $\beta \ge 0$, $0 \le \alpha+\beta \le 0.70$ may be satisfied.

Hereinafter, each component of the soft magnetic alloy according to the present embodiment will be described in detail.

M is one or more of Nb, Hf, Zr, Ta, Mo, V, Ti, and W. M may be one or more of Nb, Hf, Zr, Ta, Mo, V, and W.

M content (a) may satisfy $0 \le a \le 0.1500$ or may satisfy $0 \le a \le 0.1500$. M content (a) may satisfy $0.0300 \le a \le 0.1200$ or may satisfy $0.0350 \le a \le 0.1000$.

B content (b) may satisfy $0 \le b \le 0.2000$. That is, B may not be included. The B content (b) may satisfy $0.0500 \le b \le 0.1400$ or may satisfy $0.0700 \le b \le 0.1400$.

P content (c) may satisfy $0 \le c \le 0.2000$. That is, P may not be included. The P content (c) may satisfy $0 \le c \le 0.0700$, may satisfy $0.0001 \le c \le 0.0700$, or may satisfy $0.0001 \le c \le 0.0600$.

Si content (d) may satisfy $0 \le d \le 0.2000$. That is, Si may not be included. The Si content (d) may satisfy $0 \le d \le 0.1350$, may satisfy $0 \le d \le 0.0500$, or may satisfy $0 \le d \le 0.0300$.

Cu content (e) may satisfy $0 \le e \le 0.0400$ or may satisfy $0 \le e \le 0.0300$. That is, Cu may not be included. The Cu content (e) may satisfy $0.0001 \le e \le 0.0300$, may satisfy $0.0001 \le e \le 0.0250$, or may satisfy $0.0001 \le e \le 0.0200$.

In addition, the soft magnetic alloy according to the present embodiment may satisfy $0.7000 \le 1-(a+b+c+d+e) \le 0.9000$, may satisfy $0.7350 \le 1-(a+b+c+d+e) \le 0.8800$, and may satisfy $0.7800 \le 1-(a+b+c+d+e) \le 0.8800$.

In addition, in the soft magnetic alloy according to the present embodiment, a part of Fe may be substituted with X1 and/or X2.

X1 represents one or more of Co and Ni. Regarding X1 content, $\alpha=0$ may be satisfied. That is, X1 may not be included. In addition, the number of atoms of X1 may be 60 at % or less with the total number of atoms of the compositions being 100 at %. That is, $0 \le \alpha\{1-(a+b+c+d+e)\} \le 0.600$ may be satisfied. In addition, $0 \le \alpha\{1-(a+b+c+d+e)\} \le 0.300$ may be satisfied.

In particular, when X1 is only Co, regarding a ratio of the Co content to the Fe content, $0 < \alpha/\{1-(\alpha+\beta)\} \le 1.000$ may be satisfied.

X2 represents one or more of Al, Mn, Ag, Zn, Sn, As, Sb, Cr, Ga, Bi, N, O, C, S, and the rare earth element. Regarding an X2 content, $\beta=0$ may be satisfied. That is, X2 may not be included. In addition, the number of atoms of X2 may be 5.0 at % or less, or 3.0 at % or less with the total number of atoms of the compositions being 100 at %. That is, $0 \le \beta\{1-(a+b+c+d+e)\} \le 0.050$ may be satisfied, or $0 \le \beta\{1-(a+b+c+d+e)\} \le 0.030$ may be satisfied.

A range of a substitution amount for substituting Fe with X1 and/or X2 may be 70% or less of Fe based on the number of atoms. That is, $0 \le \alpha+\beta \le 0.70$ may be satisfied.

The soft magnetic alloy according to the present embodiment may include elements other than the elements included in the above main components, that is, elements other than Fe, X1, X2, M, B, P, Si, and Cu, as inevitable impurities within a range that does not significantly affect soft magnetic properties. For example, the inevitable impurities may be included in an amount of 0.1 mass % or less with respect to 100 mass % of the soft magnetic alloy.

A shape of the soft magnetic alloy is not particularly limited. Examples thereof include a ribbon shape and a powder shape.

The soft magnetic alloy ribbon according to the present embodiment is the above soft magnetic alloy having the ribbon shape.

The magnetic component according to the present embodiment includes the above soft magnetic alloy. The magnetic component according to the present embodiment may include the above soft magnetic alloy ribbon. Further, the magnetic component according to the present embodiment may include the above soft magnetic alloy ribbon, which is laminated, or may include the above soft magnetic alloy ribbon, which is wound.

The magnetic component according to the present embodiment includes the above soft magnetic alloy. The magnetic component according to the present embodiment may include the above soft magnetic alloy ribbon. Further, the magnetic component according to the present embodiment may include the above soft magnetic alloy ribbon fragmented by cracking or the like, which is laminated. Since local heat generation can be suppressed by fragmenting the above soft magnetic alloy ribbon, a property of the magnetic component is improved.

Since the magnetic component according to the present embodiment includes the above soft magnetic alloy, the magnetic component is a magnetic component in which the temperature property, in particular, the temperature property of core loss is improved. In particular, the magnetic component according to the present embodiment is a magnetic component with the improved temperature property of the core loss in a high-frequency range (about 100 kHz to 1 MHz).

Hereinafter, a method for manufacturing the soft magnetic alloy according to the present embodiment will be described.

Figure 3:
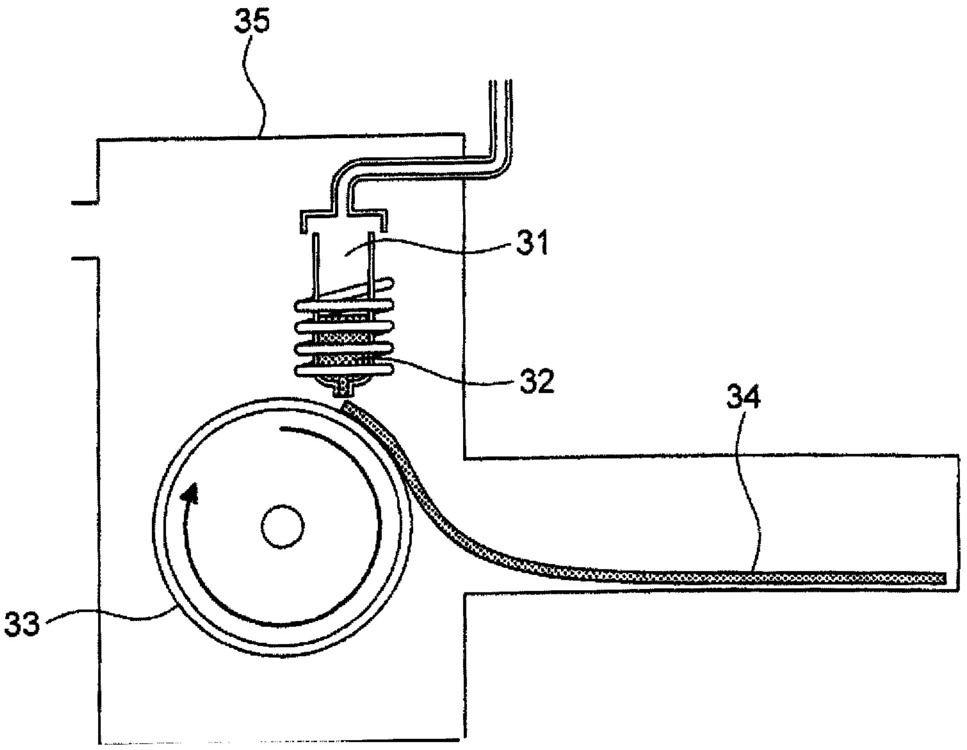
FIG. 3 is a schematic diagram of a single-roll method.

The method for manufacturing the soft magnetic alloy according to the present embodiment is not particularly limited, and examples thereof include a method for manufacturing a soft magnetic alloy ribbon by a single-roll method using a device shown in FIG. 3.

In the single-roll method, first, pure metals of metal elements included in the soft magnetic alloy to be finally obtained are prepared, and weighed so as to have the same composition as the soft magnetic alloy to be finally obtained. Then, the pure metals of the metal elements are melted and mixed to prepare a base alloy. A method for melting the pure metals is not particularly limited, and for example, there is a method for melting the pure metals by high frequency heating after vacuum-evacuating a chamber. The base alloy and the soft magnetic alloy to be finally obtained usually have the same composition.

Next, the prepared base alloy is heated and melted to obtain a molten metal. A temperature of the molten metal is not particularly limited, and may be determined in consideration of melting points of the pure metals of the metal elements. The temperature of the molten metal can be, for example, 1200° C. to 1500° C.

In the single-roll method, an obtained molten metal 32 is supplied to a roll 33 rotated in a direction of an arrow through a slit at a bottom of a nozzle 31 inside a chamber 35. The supplied molten metal 32 is rapidly cooled to manufacture a uniform soft magnetic alloy ribbon 34. A material of the roll 33 is not particularly limited, and may be, for example, copper. In addition, a thickness of the obtained soft magnetic alloy ribbon 34 can be adjusted mainly by adjusting a rotation speed of the roll 33, but for example, the thickness of the obtained soft magnetic alloy ribbon 34 can also be adjusted by adjusting a distance between the nozzle 31 and the roll 33, a temperature of the molten metal 32, and the like. The thickness of the soft magnetic alloy ribbon 34 is not particularly limited, and can be, for example, 10 μm to 50 μm.

A temperature of the roll 33 and an atmosphere and a pressure inside the chamber are not particularly limited. For example, the temperature of the roll 33 may be set to a room temperature to 50° C. The atmosphere inside the chamber 35 may be air, or may be an inert gas atmosphere.

Next, the obtained soft magnetic alloy ribbon 34 is heat-treated. Here, in order to obtain the soft magnetic alloy according to the present embodiment, it is necessary to suitably control heat treatment conditions. Specifically, the obtained soft magnetic alloy ribbon 34 is heat-treated in at least three stages. In a first stage, the obtained soft magnetic alloy ribbon 34 is heat-treated at a temperature within a range of a first crystallization temperature Tx1±10° C. A heat treatment temperature in the first stage is $T_{1st}$. In a third stage, the obtained soft magnetic alloy ribbon 34 is heat-treated at a temperature lower than a second crystallization temperature Tx2. A heat treatment temperature in the third stage is $T_{3rd}$. In a second stage, the obtained soft magnetic alloy ribbon 34 is heat-treated at a temperature higher than $T_{1st}$ by 10° C. or higher and lower than $T_{3rd}$ by 10° C. or higher. A heat treatment temperature in the second stage is $T_{2nd}$. The first crystallization temperature Tx1 is a temperature at which crystals including Fe as a main component begin to deposit, and the second crystallization temperature Tx2 is a temperature at which a compound of Fe and other constituent elements begins to be generated. Tx1 and Tx2 vary depending on a composition of the soft magnetic alloy ribbon 34.

Then, a retention time of 1 min to 180 min is set for each stage from the first stage to the third stage. When the total content of M is 3.5 at % or more, the retention time may be 10 min to 180 min, preferably 30 min to 60 min. In addition, when the M content is small, it is easy to suppress an increase in the grain size of the crystallite by shortening the retention time. In addition, a heating rate from the room temperature to the first stage, a heating rate between the first stage and the second stage, and a heating rate from the second stage to the third stage are set to 1° C./min to 100° C./min. When the total content of M is 3.5 at % or more, the heating rate is preferably 5° C./min to 50° C./min. In addition, when the M content is small, it is easy to suppress the increase in the grain size of the crystallite by increasing the heating rate. The heat treatment in each stage from the first stage to the third stage is continuously performed. That is, the obtained soft magnetic alloy ribbon 34 is not cooled to the room temperature between the first stage and the second stage, and between the second stage and the third stage. In addition, it is important to set the heating rates to 0 and to maintain the above retention times and temperatures at $T_{1st}$, $T_{2nd}$, and $T_{3rd}$. It is difficult to obtain the soft magnetic alloy ribbon 34 according to the present embodiment only by reducing the heating rate without setting the heating rate to 0.

In the first stage, mainly, a fine crystal nucleus to be the crystallite is generated. In the second stage, mainly, a primary growth of the crystallite proceeds and the fine crystal nucleus becomes the crystallite. In the third stage, mainly, a secondary growth of the crystallite proceeds. Since the heat treatment is performed at a temperature lower than Tx2 at all the stages, crystals of the compound of Fe are unlikely to occur.

The soft magnetic alloy ribbon according to the present embodiment can be obtained by the above method.

The magnetic component according to the present embodiment includes the above soft magnetic alloy ribbon. A method for preparing the magnetic component including the soft magnetic alloy ribbon is not particularly limited. For example, the magnetic component may be prepared by methods usually used, such as a method for laminating the soft magnetic alloy ribbon, a method for winding the soft magnetic alloy ribbon, or a method for laminating the fragmented soft magnetic alloy ribbon.

The shape of the soft magnetic alloy according to the present embodiment is not particularly limited. As described above, the ribbon shape is exemplified, but other than that, the powder shape, a thin film shape, a block shape, and the like can be considered.

A kind of the magnetic component according to the present embodiment is not particularly limited, and examples thereof include magnetic components, for example, a coil component and a dust core, which are required to have an excellent temperature property of core loss in a high-frequency range. In addition, examples of the coil component include a reactor, a choke coil, and a transformer. Further, an electronic device according to the present embodiment includes the above magnetic component. A kind of the electronic device is not particularly limited, and examples thereof include a DC-DC converter. In addition, an application of the electronic device is not particularly limited, and examples thereof include a hybrid electric vehicle (HEV), a plug-in hybrid electric vehicle (PHEV), and an electric vehicle (EV).

EXAMPLES

Hereinafter, the present invention will be specifically described based on examples.

Experimental Example 1

In Table 1 and Tables 3 to 7, raw metals were weighed so as to have alloy compositions shown in each table and melted by high frequency heating to prepare a base alloy. In Table 2, a base alloy was prepared such that all samples had the same composition as a sample No. 1 in Table 1. In Table 8, a base alloy was prepared such that all samples had the same composition as a sample No. 3 in Table 1. The alloy compositions according to the present example are compositions that do not include X1 and X2.

Thereafter, the prepared base alloy was heated and melted to form a molten metal at 1200° C. to 1500° C., and then the metal was injected onto a roll by a single-roll method in the air to prepare a ribbon.

An X-ray diffraction measurement was performed on each of the obtained ribbons, and it was confirmed that there were no crystals larger than nanocrystals.

Then, the ribbon is heat-treated under heat treatment conditions shown in Tables 1 to 8. In all the examples, it was confirmed that $T_{1st}$ is within a range of Tx1±10° C., $T_{3rd}$ is less than Tx2, and $T_{2nd}$ is higher than $T_{1st}$ by 10° C. or higher and lower than $T_{3rd}$ by 10° C. or higher. In Table 1 and Tables 3 to 7, a heating rate from the room temperature to $T_{1st}$, a heating rate from $T_{1st}$ to $T_{2nd}$, and a heating rate from $T_{2nd}$ to $T_{3rd}$ were set to 10° C./min.

It was confirmed by ICP analysis that compositions of the obtained ribbon after the heat treatment and compositions of the base alloy do not change.

It was confirmed by an X-ray diffractometer (XRD) that each ribbon after the heat treatment includes a crystallite of α-Fe. Further, the ribbon was observed using a transmission electron microscope (TEM). In the observation using the TEM, a magnification was $1.00\times10^5$ to $3.00\times10^5$ times, and a size of an observation range was 128 nm×128 nm. A TEM sample was prepared using FIB so as to have a thickness of 20 nm. The thickness of the TEM sample was confirmed by electron energy-loss spectroscopy (EELS). By the observation using the TEM, a total area ratio of the crystallite, an average thickness of an amorphous phase, and a standard deviation of a thickness of the amorphous phase were calculated. Results are shown in Tables 1 to 8.

Further, a temperature property of core loss was evaluated for a magnetic core prepared by laminating five of the obtained ribbons. Specifically, the temperature property of core loss was measured at temperatures of −30° C., −10° C., 0° C., 10° C., 30° C., 50° C., 80° C., 100° C., 120° C., and 140° C. under conditions of a measurement frequency of 600 kHz and a maximum magnetic flux density of 60 mT, using a BH analyzer [SY8217 manufactured by IWATSU TEST INSTRUMENTS CORPORATION]. Then, for the core loss at each temperature, a change rate from the core loss at 30° C. was calculated. An absolute value of the change rate in the core loss when the absolute value of the change rate in the core loss is the largest was taken as a maximum change rate in the core loss.

The temperature property of the core loss was defined as A+ when the maximum change rate in the core loss was less than 6.0%, the temperature property of the core loss was defined as A when the maximum change rate in the core loss was 6.0% or more and less than 7.0%, the temperature property of the core loss was defined as B when the maximum change rate in the core loss was 7.0% or more and less than 11.0%, the temperature property of the core loss was defined as C when the maximum change rate in the core loss was 11.0% or more and less than 20.0%, and the temperature property of the core loss was defined as D when the maximum change rate in the core loss was 20.0% or more. A case where the temperature property of the core loss was A+ to C was evaluated as good, a case where the temperature property of the core loss was A+ to B was evaluated as better, a case where the temperature property of the core loss was A+ to A was evaluated as even better, and a case where the temperature property of the core loss was A+ was evaluated as best.

TABLE 1

| Sample No. | Example/Comparative Example | $Fe_{(1-(a+b+c+d+e))}M_aB_bP_cSi_dCu_e$ Fe | a | b | c | d | e | M | Heat treatment condition, First stage $T_{1st}$ ° C. | Retention time min |
|---|---|---|---|---|---|---|---|---|---|---|
| 1 | Example | 0.8200 | 0.0600 | 0.0900 | 0.0300 | 0.0000 | 0.0000 | Nb | 490 | 60 |
| 1a | Example | 0.8250 | 0.0600 | 0.0800 | 0.0300 | 0.0000 | 0.0050 | Nb | 460 | 60 |
| 2 | Example | 0.8200 | 0.0450 | 0.0900 | 0.0150 | 0.0300 | 0.0000 | Nb | 480 | 60 |
| 2a | Example | 0.8800 | 0.0550 | 0.0500 | 0.0100 | 0.0000 | 0.0050 | Nb | 440 | 60 |
| 2b | Example | 0.8000 | 0.0450 | 0.0900 | 0.0150 | 0.0500 | 0.0000 | Nb | 500 | 60 |
| 3 | Example | 0.7350 | 0.0300 | 0.0900 | 0.0000 | 0.1350 | 0.0100 | Nb | 530 | 60 |

| Sample No. | Heat treatment condition, Second stage $T_{2nd}$ ° C. | Retention time min | Third stage $T_{3rd}$ ° C. | Retention time min | Area ratio of crystallite % | Average thickness of amorphous phase nm | Standard deviation of thickness of amorphous phase nm | Average grain size of crystallite nm | Maximum change rate in core loss % | Temperature property of core loss |
|---|---|---|---|---|---|---|---|---|---|---|
| 1 | 550 | 60 | 600 | 60 | 49 | 6.9 | 6.1 | 12.9 | 3.2 | A+ |
| 1a | 550 | 60 | 600 | 60 | 54 | 4.7 | 4.2 | 8.1 | 6.0 | A |
| 2 | 550 | 60 | 600 | 60 | 46 | 7.2 | 6.5 | 11.8 | 4.8 | A+ |
| 2a | 540 | 60 | 570 | 60 | 58 | 7.9 | 7.4 | 13.8 | 6.8 | A |

TABLE 1-continued

| | | | | | | | | | | |
|---|---|---|---|---|---|---|---|---|---|---|
| 2b | 550 | 60 | 600 | 60 | 48 | 7.0 | 6.7 | 12.0 | 5.3 | A+ |
| 3 | 550 | 60 | 600 | 60 | 56 | 6.3 | 5.9 | 22.4 | 11.2 | C |

TABLE 2

| | | Heat treatment condition | | | | | | |
|---|---|---|---|---|---|---|---|---|
| | | First stage | | Second stage | | Third stage | | Room temperature |
| Sample No. | Example/ Comparative Example | $T_{1st}$ ° C. | Retention time min | $T_{2nd}$ ° C. | Retention time min | $T_{3rd}$ ° C. | Retention time min | to $T_{1st}$ heating rate ° C./min |
| 4 | Example | 490 | 60 | 550 | 60 | 620 | 60 | 10 |
| 1 | Example | 490 | 60 | 550 | 60 | 600 | 60 | 10 |
| 5 | Example | 490 | 60 | 500 | 60 | 550 | 60 | 10 |
| 6 | Example | 490 | 60 | 500 | 60 | 510 | 60 | 10 |
| 7 | Example | 480 | 60 | 550 | 60 | 600 | 60 | 10 |
| 8 | Example | 500 | 60 | 550 | 60 | 600 | 60 | 10 |
| 9 | Example | 490 | 60 | 500 | 60 | 600 | 60 | 10 |
| 10 | Example | 490 | 60 | 590 | 60 | 600 | 60 | 10 |
| 11 | Example | 480 | 60 | 500 | 60 | 600 | 60 | 10 |
| 12 | Example | 500 | 60 | 500 | 60 | 600 | 60 | 10 |
| 13 | Example | 480 | 60 | 590 | 60 | 600 | 60 | 10 |
| 14 | Example | 500 | 60 | 590 | 60 | 600 | 60 | 10 |
| 15 | Example | 490 | 10 | 550 | 60 | 600 | 60 | 10 |
| 16 | Example | 490 | 180 | 550 | 60 | 600 | 60 | 10 |
| 17 | Example | 490 | 60 | 550 | 10 | 600 | 60 | 10 |
| 18 | Example | 490 | 60 | 550 | 180 | 600 | 60 | 10 |
| 19 | Example | 490 | 60 | 550 | 60 | 600 | 10 | 10 |
| 20 | Example | 490 | 60 | 550 | 60 | 600 | 180 | 10 |
| 21 | Example | 490 | 10 | 550 | 10 | 600 | 10 | 10 |
| 22 | Example | 490 | 180 | 550 | 180 | 600 | 180 | 10 |
| 23 | Example | 490 | 60 | 550 | 60 | 600 | 60 | 1 |
| 24 | Example | 490 | 60 | 550 | 60 | 600 | 60 | 100 |
| 25 | Example | 490 | 60 | 550 | 60 | 600 | 60 | 10 |
| 26 | Example | 490 | 60 | 550 | 60 | 600 | 60 | 10 |
| 27 | Example | 490 | 60 | 550 | 60 | 600 | 60 | 10 |
| 28 | Example | 490 | 60 | 550 | 60 | 600 | 60 | 10 |
| 29 | Example | 490 | 60 | 550 | 60 | 600 | 60 | 1 |
| 30 | Example | 490 | 60 | 550 | 60 | 600 | 60 | 100 |
| 31 | Comparative Example | 550 | 60 | — | — | — | — | 10 |
| 32 | Comparative Example | 490 | 60 | 500 | 10 | — | — | 10 |
| 33 | Comparative Example | 490 | 60 | 550 | 60 | 630 | 60 | 10 |
| 34 | Comparative Example | 490 | 60 | 550 | 90 | 600 | 90 | 10 |
| 35 | Comparative Example | 490 | 30 | — | — | — | — | 10 |
| 36 | Comparative Example | 490 | 10 | 600 | 60 | — | — | 10 |
| 37 | Comparative Example | 490 | 60 | 600 | 60 | — | — | 10 |
| 38 | Comparative Example | 490 | 120 | 600 | 60 | — | — | 10 |
| 39 | Comparative Example | 490 | 60 | 600 | 120 | — | — | 10 |
| 40 | Comparative Example | 490 | 60 | 550 | 60 | — | — | 10 |
| 41 | Comparative Example | 490 | 120 | 550 | 60 | — | — | 10 |
| 42 | Comparative Example | 490 | 60 | 600 | 120 | — | — | 10 |
| 43 | Comparative Example | 550 | 60 | 600 | 60 | — | — | 10 |
| 44 | Comparative Example | 550 | 120 | 600 | 60 | — | — | 10 |
| 45 | Comparative Example | 550 | 60 | 600 | 120 | — | — | 10 |
| 46 | Comparative Example | 490 | 180 | — | — | — | — | 10 |
| 47 | Comparative Example | 550 | 180 | — | — | — | — | 10 |

TABLE 2-continued

| | | | | | | | | |
|---|---|---|---|---|---|---|---|---|
| 48 | Comparative Example | 600 | 180 | — | — | — | — | 10 |
| 49 | Comparative Example | 490 | 60 | 600 | 60 | — | — | 10 |

| Sample No. | Heat treatment condition: $T_{1st}$ to $T_{2nd}$ heating rate ° C./min | Heat treatment condition: $T_{2nd}$ to $T_{3rd}$ heating rate ° C./min | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|
| 4 | 10 | 10 | 54 | 4.8 | 4.4 | 15.8 | 6.8 | A |
| 1 | 10 | 10 | 49 | 6.9 | 6.1 | 12.9 | 3.2 | A+ |
| 5 | 10 | 10 | 45 | 7.3 | 6.8 | 10.3 | 3.6 | A+ |
| 6 | 10 | 10 | 43 | 8.2 | 7.9 | 8.9 | 4.0 | A+ |
| 7 | 10 | 10 | 53 | 8.3 | 6.8 | 9.8 | 3.2 | A+ |
| 8 | 10 | 10 | 55 | 4.5 | 3.5 | 12.2 | 4.1 | A+ |
| 9 | 10 | 10 | 51 | 7.6 | 7.4 | 11.0 | 4.0 | A+ |
| 10 | 10 | 10 | 55 | 8.8 | 6.9 | 12.2 | 3.5 | A+ |
| 11 | 10 | 10 | 49 | 7.0 | 5.7 | 12.3 | 3.8 | A+ |
| 12 | 10 | 10 | 51 | 6.4 | 5.1 | 10.9 | 4.3 | A+ |
| 13 | 10 | 10 | 49 | 6.8 | 6.1 | 13.2 | 3.8 | A+ |
| 14 | 10 | 10 | 49 | 7.8 | 6.9 | 13.0 | 3.1 | A+ |
| 15 | 10 | 10 | 43 | 7.2 | 6.0 | 12.6 | 4.1 | A+ |
| 16 | 10 | 10 | 54 | 9.1 | 5.0 | 11.2 | 3.3 | A+ |
| 17 | 10 | 10 | 53 | 9.4 | 5.3 | 10.5 | 3.1 | A+ |
| 18 | 10 | 10 | 54 | 5.0 | 7.9 | 11.6 | 4.0 | A+ |
| 19 | 10 | 10 | 45 | 4.0 | 4.3 | 11.7 | 4.7 | A+ |
| 20 | 10 | 10 | 53 | 6.2 | 7.3 | 13.9 | 3.5 | A+ |
| 21 | 10 | 10 | 52 | 5.4 | 4.6 | 10.2 | 4.0 | A+ |
| 22 | 10 | 10 | 44 | 9.2 | 6.0 | 13.8 | 3.2 | A+ |
| 23 | 10 | 10 | 42 | 8.0 | 7.8 | 9.0 | 3.5 | A+ |
| 24 | 10 | 10 | 55 | 4.1 | 7.6 | 12.2 | 3.7 | A+ |
| 25 | 1 | 10 | 52 | 4.0 | 5.5 | 11.2 | 3.6 | A+ |
| 26 | 100 | 10 | 49 | 6.1 | 5.6 | 9.0 | 3.9 | A+ |
| 27 | 10 | 1 | 43 | 8.9 | 7.7 | 14.0 | 4.2 | A+ |
| 28 | 10 | 100 | 53 | 9.3 | 6.7 | 9.8 | 4.9 | A+ |
| 29 | 1 | 1 | 46 | 6.8 | 7.6 | 11.4 | 3.4 | A+ |
| 30 | 100 | 100 | 47 | 4.5 | 3.2 | 13.4 | 3.2 | A+ |
| 31 | — | — | 36 | 13.3 | 10.4 | 12.6 | 109.4 | D |
| 32 | 10 | — | 38 | 9.6 | 8.9 | 3.5 | 89.3 | D |
| 33 | 10 | 10 | 63 | 3.1 | 2.5 | 16.4 | 92.5 | D |
| 34 | 10 | 10 | 57 | 2.5 | 4.3 | 17.2 | 110.3 | D |
| 35 | — | — | 42 | 12.4 | 9.8 | 3.8 | 120.4 | D |
| 36 | 10 | — | 48 | 7.3 | 11.3 | 7.3 | 104.3 | D |
| 37 | 10 | — | 49 | 8.7 | 10.4 | 14.5 | 67.4 | D |
| 38 | 10 | — | 40 | 8.8 | 11.2 | 14.1 | 44.7 | D |
| 39 | 10 | — | 46 | 8.0 | 13.5 | 13.5 | 54.6 | D |
| 40 | 10 | — | 41 | 13.2 | 13.2 | 10.2 | 113.7 | D |
| 41 | 10 | — | 40 | 11.5 | 11.5 | 10.1 | 108.4 | D |
| 42 | 10 | — | 42 | 11.5 | 11.5 | 8.2 | 94.2 | D |
| 43 | 10 | — | 46 | 9.6 | 12.1 | 11.1 | 43.2 | D |
| 44 | 10 | — | 48 | 8.0 | 11.5 | 10.5 | 28.8 | D |
| 45 | 10 | — | 51 | 9.4 | 12.1 | 13.7 | 31.6 | D |
| 46 | — | — | 29 | 13.7 | 12.3 | 4.2 | 112.4 | D |
| 47 | — | — | 41 | 11.8 | 9.8 | 9.9 | 76.3 | D |
| 48 | — | — | 53 | 2.6 | 10.4 | 15.8 | 29.4 | D |
| 49 | 1.55 | — | 51 | 2.8 | 11.5 | 14.9 | 38.9 | D |

TABLE 3

| Sample No. | Example/ Comparative Example | $Fe_{(1-(a+b+c+d+e))}M_aB_bP_cSi_dCu_e$: Fe | a | b | c | d | e | M | Heat treatment condition, First stage: $T_{1st}$ ° C. | Heat treatment condition, First stage: Retention time min |
|---|---|---|---|---|---|---|---|---|---|---|
| 1 | Example | 0.8200 | 0.0600 | 0.0900 | 0.0300 | 0.0000 | 0.0000 | Nb | 490 | 60 |
| 50 | Example | 0.8200 | 0.0600 | 0.0900 | 0.0300 | 0.0000 | 0.0000 | Hf | 490 | 60 |
| 51 | Example | 0.8200 | 0.0600 | 0.0900 | 0.0300 | 0.0000 | 0.0000 | Zr | 490 | 60 |
| 52 | Example | 0.8200 | 0.0600 | 0.0900 | 0.0300 | 0.0000 | 0.0000 | Ta | 490 | 60 |
| 53 | Example | 0.8200 | 0.0600 | 0.0900 | 0.0300 | 0.0000 | 0.0000 | Mo | 490 | 60 |

TABLE 3-continued

| | | | | | | | | | | |
|---|---|---|---|---|---|---|---|---|---|---|
| 54 | Example | 0.8200 | 0.0600 | 0.0900 | 0.0300 | 0.0000 | 0.0000 | V | 490 | 60 |
| 55 | Example | 0.8200 | 0.0600 | 0.0900 | 0.0300 | 0.0000 | 0.0000 | W | 490 | 60 |
| 56 | Example | 0.8200 | 0.0600 | 0.0900 | 0.0300 | 0.0000 | 0.0000 | $Nb_{0.5}Hf_{0.5}$ | 490 | 60 |
| 57 | Example | 0.8200 | 0.0600 | 0.0900 | 0.0300 | 0.0000 | 0.0000 | $Nb_{0.5}Zr_{0.5}$ | 490 | 60 |

| Sample No. | Heat treatment condition, Second stage, $T_{2nd}$ ° C. | Heat treatment condition, Second stage, Retention time min | Heat treatment condition, Third stage, $T_{3rd}$ ° C. | Heat treatment condition, Third stage, Retention Time min | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|---|
| 1 | 550 | 60 | 600 | 60 | 49 | 6.9 | 6.1 | 12.9 | 3.2 | A+ |
| 50 | 550 | 60 | 600 | 60 | 48 | 6.7 | 6.3 | 11.8 | 3.5 | A+ |
| 51 | 550 | 60 | 600 | 60 | 50 | 6.6 | 6.1 | 12.6 | 3.7 | A+ |
| 52 | 550 | 60 | 600 | 60 | 50 | 6.9 | 5.9 | 12.2 | 3.5 | A+ |
| 53 | 550 | 60 | 600 | 60 | 49 | 7.2 | 6.0 | 12.7 | 3.9 | A+ |
| 54 | 550 | 60 | 600 | 60 | 48 | 6.8 | 6.2 | 12.4 | 4.1 | A+ |
| 55 | 550 | 60 | 600 | 60 | 49 | 7.1 | 6.7 | 11.9 | 4.3 | A+ |
| 56 | 550 | 60 | 600 | 60 | 47 | 7.0 | 6.5 | 11.4 | 4.2 | A+ |
| 57 | 550 | 60 | 600 | 60 | 48 | 6.9 | 6.3 | 12.3 | 3.9 | A+ |

TABLE 4

| Sample No. | Example/ Comparative Example | $Fe_{(1-(a+b+c+d+e))}M_aB_bP_cSi_dCu_e$ Fe | a | b | c | d | e | M | Heat treatment condition, First stage, $T_{1st}$ ° C. | First stage, Retention time min | Second stage, $T_{2nd}$ ° C. | Second stage, Retention time min | Third stage, $T_{3rd}$ ° C. | Third stage, Retention time min |
|---|---|---|---|---|---|---|---|---|---|---|---|---|---|---|
| 58 | Example | 0.8200 | 0.0600 | 0.0900 | 0.0300 | 0.0000 | 0.0000 | Nb | 490 | 60 | 500 | 60 | 510 | 10 |
| 59 | Example | 0.8200 | 0.0600 | 0.0900 | 0.0300 | 0.0000 | 0.0000 | Nb | 490 | 60 | 500 | 60 | 510 | 30 |
| 6 | Example | 0.8200 | 0.0600 | 0.0900 | 0.0300 | 0.0000 | 0.0000 | Nb | 490 | 60 | 500 | 60 | 510 | 60 |
| 1 | Example | 0.8200 | 0.0600 | 0.0900 | 0.0300 | 0.0000 | 0.0000 | Nb | 490 | 60 | 550 | 60 | 600 | 60 |
| 60 | Example | 0.8200 | 0.0600 | 0.0900 | 0.0300 | 0.0000 | 0.0000 | Nb | 490 | 60 | 550 | 60 | 610 | 60 |
| 4 | Example | 0.8200 | 0.0600 | 0.0900 | 0.0300 | 0.0000 | 0.0000 | Nb | 490 | 60 | 550 | 60 | 620 | 60 |
| 33 | Comparative Example | 0.8200 | 0.0600 | 0.0900 | 0.0300 | 0.0000 | 0.0000 | Nb | 490 | 60 | 550 | 60 | 630 | 60 |

| Sample No. | Example/ Comparative Example | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|
| 58 | Example | 40 | 9.1 | 8.8 | 4.1 | 4.4 | A+ |
| 59 | Example | 41 | 8.7 | 8.2 | 5.3 | 4.2 | A+ |
| 6 | Example | 43 | 8.2 | 7.9 | 8.9 | 4.0 | A+ |
| 1 | Example | 49 | 6.9 | 6.1 | 12.9 | 3.2 | A+ |
| 60 | Example | 51 | 5.4 | 5.1 | 14.6 | 4.8 | A+ |
| 4 | Example | 54 | 4.8 | 4.4 | 15.8 | 6.8 | A |
| 33 | Comparative Example | 63 | 3.1 | 2.5 | 16.4 | 92.5 | D |

TABLE 5A

| Sample No. | Example/ Comparative Example | $Fe_{(1-(a+b+c+d+e))}M_aB_bP_cSi_dCu_e$ Fe | a | b | c | d | e | M | Heat treatment condition, First stage, $T_{1st}$ ° C. | First stage, Retention time min | Second stage, $T_{2nd}$ ° C. | Second stage, Retention time min | Third stage, $T_{3rd}$ ° C. | Third stage, Retention time min |
|---|---|---|---|---|---|---|---|---|---|---|---|---|---|---|
| 61 | Comparative Example | 0.8000 | 0.0000 | 0.1700 | 0.0300 | 0.0000 | 0.0000 | Nb | 490 | 60 | 520 | 60 | 550 | 60 |

TABLE 5A-continued

| | | | | | | | | | | | | | | |
|---|---|---|---|---|---|---|---|---|---|---|---|---|---|---|
| 62 | Example | 0.8000 | 0.0100 | 0.1600 | 0.0300 | 0.0000 | 0.0000 | Nb | 490 | 60 | 540 | 60 | 570 | 60 |
| 63 | Example | 0.8000 | 0.0300 | 0.1400 | 0.0300 | 0.0000 | 0.0000 | Nb | 500 | 60 | 550 | 60 | 590 | 60 |
| 64 | Example | 0.8000 | 0.0340 | 0.1360 | 0.0300 | 0.0000 | 0.0000 | Nb | 500 | 60 | 550 | 60 | 600 | 60 |
| 65 | Example | 0.8000 | 0.0350 | 0.1350 | 0.0300 | 0.0000 | 0.0000 | Nb | 500 | 60 | 550 | 60 | 600 | 60 |
| 66 | Example | 0.8000 | 0.0450 | 0.1250 | 0.0300 | 0.0000 | 0.0000 | Nb | 510 | 60 | 550 | 60 | 600 | 60 |
| 67 | Example | 0.8000 | 0.0600 | 0.1100 | 0.0300 | 0.0000 | 0.0000 | Nb | 510 | 60 | 550 | 60 | 600 | 60 |
| 68 | Example | 0.8000 | 0.0700 | 0.1000 | 0.0300 | 0.0000 | 0.0000 | Nb | 510 | 60 | 550 | 60 | 620 | 60 |
| 69 | Example | 0.8000 | 0.1000 | 0.0700 | 0.0300 | 0.0000 | 0.0000 | Nb | 530 | 60 | 570 | 60 | 640 | 60 |
| 70 | Example | 0.8000 | 0.1200 | 0.0500 | 0.0300 | 0.0000 | 0.0000 | Nb | 540 | 60 | 570 | 60 | 640 | 60 |
| 71 | Example | 0.8500 | 0.0300 | 0.0900 | 0.0300 | 0.0000 | 0.0000 | Nb | 460 | 60 | 550 | 60 | 600 | 60 |
| 72 | Example | 0.8460 | 0.0340 | 0.0900 | 0.0300 | 0.0000 | 0.0000 | Nb | 470 | 60 | 550 | 60 | 600 | 60 |
| 73 | Example | 0.8450 | 0.0350 | 0.0900 | 0.0300 | 0.0000 | 0.0000 | Nb | 470 | 60 | 550 | 60 | 600 | 60 |
| 74 | Example | 0.8350 | 0.0450 | 0.0900 | 0.0300 | 0.0000 | 0.0000 | Nb | 480 | 60 | 550 | 60 | 600 | 60 |
| 1 | Example | 0.8200 | 0.0600 | 0.0900 | 0.0300 | 0.0000 | 0.0000 | Nb | 490 | 60 | 550 | 60 | 600 | 60 |
| 75 | Example | 0.8100 | 0.0700 | 0.0900 | 0.0300 | 0.0000 | 0.0000 | Nb | 500 | 60 | 550 | 60 | 600 | 60 |
| 76 | Example | 0.7800 | 0.1000 | 0.0900 | 0.0300 | 0.0000 | 0.0000 | Nb | 520 | 60 | 570 | 60 | 630 | 60 |
| 77 | Example | 0.7600 | 0.1200 | 0.0900 | 0.0300 | 0.0000 | 0.0000 | Nb | 540 | 60 | 570 | 60 | 630 | 60 |
| 71-2 | Example | 0.8500 | 0.0300 | 0.0900 | 0.0300 | 0.0000 | 0.0000 | Hf | 460 | 60 | 550 | 60 | 600 | 60 |
| 72-2 | Example | 0.8460 | 0.0340 | 0.0900 | 0.0300 | 0.0000 | 0.0000 | Hf | 470 | 60 | 550 | 60 | 600 | 60 |
| 73-2 | Example | 0.8450 | 0.0350 | 0.0900 | 0.0300 | 0.0000 | 0.0000 | Hf | 470 | 60 | 550 | 60 | 600 | 60 |
| 74-2 | Example | 0.8350 | 0.0450 | 0.0900 | 0.0300 | 0.0000 | 0.0000 | Hf | 480 | 60 | 550 | 60 | 600 | 60 |
| 50 | Example | 0.8200 | 0.0600 | 0.0900 | 0.0300 | 0.0000 | 0.0000 | Hf | 490 | 60 | 550 | 60 | 600 | 60 |
| 75-2 | Example | 0.8100 | 0.0700 | 0.0900 | 0.0300 | 0.0000 | 0.0000 | Hf | 500 | 60 | 550 | 60 | 600 | 60 |
| 76-2 | Example | 0.7800 | 0.1000 | 0.0900 | 0.0300 | 0.0000 | 0.0000 | Hf | 520 | 60 | 570 | 60 | 630 | 60 |
| 71-3 | Example | 0.8500 | 0.0300 | 0.0900 | 0.0300 | 0.0000 | 0.0000 | Zr | 460 | 60 | 550 | 60 | 600 | 60 |
| 72-3 | Example | 0.8460 | 0.0340 | 0.0900 | 0.0300 | 0.0000 | 0.0000 | Zr | 470 | 60 | 550 | 60 | 600 | 60 |
| 73-3 | Example | 0.8450 | 0.0350 | 0.0900 | 0.0300 | 0.0000 | 0.0000 | Zr | 470 | 60 | 550 | 60 | 600 | 60 |
| 74-3 | Example | 0.8350 | 0.0450 | 0.0900 | 0.0300 | 0.0000 | 0.0000 | Zr | 480 | 60 | 550 | 60 | 600 | 60 |
| 51 | Example | 0.8200 | 0.0600 | 0.0900 | 0.0300 | 0.0000 | 0.0000 | Zr | 490 | 60 | 550 | 60 | 600 | 60 |
| 75-3 | Example | 0.8100 | 0.0700 | 0.0900 | 0.0300 | 0.0000 | 0.0000 | Zr | 500 | 60 | 550 | 60 | 600 | 60 |
| 76-3 | Example | 0.7800 | 0.1000 | 0.0900 | 0.0300 | 0.0000 | 0.0000 | Zr | 520 | 60 | 570 | 60 | 630 | 60 |
| 71-4 | Example | 0.8500 | 0.0300 | 0.0900 | 0.0300 | 0.0000 | 0.0000 | Ta | 460 | 60 | 550 | 60 | 600 | 60 |
| 72-4 | Example | 0.8460 | 0.0340 | 0.0900 | 0.0300 | 0.0000 | 0.0000 | Ta | 470 | 60 | 550 | 60 | 600 | 60 |
| 73-4 | Example | 0.8450 | 0.0350 | 0.0900 | 0.0300 | 0.0000 | 0.0000 | Ta | 470 | 60 | 550 | 60 | 600 | 60 |
| 74-4 | Example | 0.8350 | 0.0450 | 0.0900 | 0.0300 | 0.0000 | 0.0000 | Ta | 480 | 60 | 550 | 60 | 600 | 60 |
| 52 | Example | 0.8200 | 0.0600 | 0.0900 | 0.0300 | 0.0000 | 0.0000 | Ta | 490 | 60 | 550 | 60 | 600 | 60 |
| 75-4 | Example | 0.8100 | 0.0700 | 0.0900 | 0.0300 | 0.0000 | 0.0000 | Ta | 500 | 60 | 550 | 60 | 600 | 60 |
| 76-4 | Example | 0.7800 | 0.1000 | 0.0900 | 0.0300 | 0.0000 | 0.0000 | Ta | 520 | 60 | 570 | 60 | 630 | 60 |
| 71-5 | Example | 0.8500 | 0.0300 | 0.0900 | 0.0300 | 0.0000 | 0.0000 | Mo | 460 | 60 | 550 | 60 | 600 | 60 |
| 72-5 | Example | 0.8460 | 0.0340 | 0.0900 | 0.0300 | 0.0000 | 0.0000 | Mo | 470 | 60 | 550 | 60 | 600 | 60 |
| 73-5 | Example | 0.8450 | 0.0350 | 0.0900 | 0.0300 | 0.0000 | 0.0000 | Mo | 470 | 60 | 550 | 60 | 600 | 60 |
| 74-5 | Example | 0.8350 | 0.0450 | 0.0900 | 0.0300 | 0.0000 | 0.0000 | Mo | 480 | 60 | 550 | 60 | 600 | 60 |
| 53 | Example | 0.8200 | 0.0600 | 0.0900 | 0.0300 | 0.0000 | 0.0000 | Mo | 490 | 60 | 550 | 60 | 600 | 60 |
| 75-5 | Example | 0.8100 | 0.0700 | 0.0900 | 0.0300 | 0.0000 | 0.0000 | Mo | 500 | 60 | 550 | 60 | 600 | 60 |
| 76-5 | Example | 0.7800 | 0.1000 | 0.0900 | 0.0300 | 0.0000 | 0.0000 | Mo | 520 | 60 | 570 | 60 | 630 | 60 |

| Sample No. | Example/ Comparative Example | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|
| 61 | Comparative Example | 73 | 2.8 | 64 | 46.9 | 96.3 | D |
| 62 | Example | 58 | 8.4 | 9.3 | 18.3 | 15.4 | C |
| 63 | Example | 56 | 8.2 | 7.2 | 14.9 | 10.5 | B |
| 64 | Example | 53 | 6.5 | 6.3 | 14.4 | 7.2 | B |
| 65 | Example | 53 | 6.6 | 5.9 | 14.2 | 5.8 | A+ |
| 66 | Example | 51 | 6.8 | 6.2 | 13.8 | 4.3 | A+ |
| 67 | Example | 47 | 7.1 | 6.4 | 13.1 | 3.5 | A+ |
| 68 | Example | 46 | 7.5 | 7.2 | 11.8 | 4.1 | A+ |
| 69 | Example | 44 | 8.2 | 7.9 | 8.6 | 4.5 | A+ |
| 70 | Example | 42 | 8.8 | 8.1 | 5.3 | 12.1 | C |
| 71 | Example | 53 | 7.9 | 7.7 | 14.8 | 7.9 | B |
| 72 | Example | 51 | 6.8 | 7.5 | 14.5 | 7.2 | B |
| 73 | Example | 50 | 6.5 | 7.4 | 14.3 | 6.2 | A |
| 74 | Example | 48 | 6.4 | 6.9 | 14.1 | 4.5 | A+ |
| 1 | Example | 49 | 6.9 | 6.1 | 12.9 | 3.2 | A+ |
| 75 | Example | 46 | 7.3 | 6.6 | 11.6 | 4.4 | A+ |
| 76 | Example | 44 | 7.5 | 7.1 | 8.8 | 4.8 | A+ |
| 77 | Example | 42 | 8.1 | 7.7 | 5.9 | 13.2 | C |
| 71-2 | Example | 55 | 7.0 | 6.1 | 13.8 | 8.3 | B |
| 72-2 | Example | 53 | 6.8 | 5.5 | 12.9 | 7.9 | B |
| 73-2 | Example | 49 | 6.7 | 6.1 | 11.6 | 6.9 | A |
| 74-2 | Example | 50 | 5.4 | 5.0 | 10.8 | 5.8 | A+ |
| 50 | Example | 48 | 6.7 | 6.3 | 11.8 | 3.5 | A+ |
| 75-2 | Example | 49 | 6.9 | 6.8 | 9.1 | 5.4 | A+ |
| 76-2 | Example | 44 | 7.1 | 6.3 | 8.5 | 5.8 | A+ |
| 71-3 | Example | 54 | 6.5 | 7.1 | 14.2 | 9.2 | B |

TABLE 5A-continued

| | | | | | | | |
|---|---|---|---|---|---|---|---|
| 72-3 | Example | 52 | 7.9 | 6.5 | 13.8 | 7.6 | B |
| 73-3 | Example | 52 | 6.7 | 6.1 | 13.5 | 6.8 | A |
| 74-3 | Example | 49 | 6.9 | 5.9 | 12.2 | 5.2 | A+ |
| 51 | Example | 50 | 6.6 | 6.1 | 12.6 | 3.7 | A+ |
| 75-3 | Example | 47 | 7.0 | 5.8 | 9.8 | 5.5 | A+ |
| 76-3 | Example | 43 | 6.8 | 6.6 | 7.9 | 5.7 | A+ |
| 71-4 | Example | 55 | 7.1 | 6.8 | 13.7 | 9.7 | B |
| 72-4 | Example | 53 | 6.8 | 7.2 | 13.2 | 8.2 | B |
| 73-4 | Example | 51 | 6.6 | 6.3 | 12.7 | 6.6 | A |
| 74-4 | Example | 51 | 6.9 | 6.1 | 12.6 | 5.8 | A+ |
| 52 | Example | 50 | 6.9 | 5.9 | 12.2 | 3.5 | A+ |
| 75-4 | Example | 48 | 7.1 | 5.9 | 11.2 | 4.7 | A+ |
| 76-4 | Example | 44 | 7.0 | 6.4 | 9.9 | 5.3 | A+ |
| 71-5 | Example | 53 | 7.2 | 7.1 | 14.4 | 9.3 | B |
| 72-5 | Example | 51 | 7.6 | 7.9 | 13.9 | 8.1 | B |
| 73-5 | Example | 51 | 6.9 | 6.2 | 13.6 | 6.6 | A |
| 74-5 | Example | 50 | 6.1 | 5.6 | 11.9 | 5.6 | A+ |
| 53 | Example | 49 | 7.2 | 6.0 | 12.7 | 3.9 | A+ |
| 75-5 | Example | 48 | 6.2 | 5.9 | 9.5 | 5.3 | A+ |
| 76-5 | Example | 44 | 7.5 | 6.4 | 8.8 | 5.8 | A+ |

TABLE 5B

| Sample | Example/ Comparative | $Fe_{(1-(a+b+c+d+e))}M_aB_bP_cSi_dCu_e$ | | | | | | | Heat treatment condition: First stage $T_{1st}$ | Retention time | Second stage $T_{2nd}$ | Retention time | Third stage $T_{3rd}$ | Retention time |
|---|---|---|---|---|---|---|---|---|---|---|---|---|---|---|
| No. | Example | Fe | a | b | c | d | e | M | ° C. | min | ° C. | min | ° C. | min |
| 71-6 | Example | 0.8500 | 0.0300 | 0.0900 | 0.0300 | 0.0000 | 0.0000 | V | 460 | 60 | 550 | 60 | 600 | 60 |
| 72-6 | Example | 0.8460 | 0.0340 | 0.0900 | 0.0300 | 0.0000 | 0.0000 | V | 470 | 60 | 550 | 60 | 600 | 60 |
| 73-6 | Example | 0.8450 | 0.0350 | 0.0900 | 0.0300 | 0.0000 | 0.0000 | V | 470 | 60 | 550 | 60 | 600 | 60 |
| 74-6 | Example | 0.8350 | 0.0450 | 0.0900 | 0.0300 | 0.0000 | 0.0000 | V | 480 | 60 | 550 | 60 | 600 | 60 |
| 54 | Example | 0.8200 | 0.0600 | 0.0900 | 0.0300 | 0.0000 | 0.0000 | V | 490 | 60 | 550 | 60 | 600 | 60 |
| 71-7 | Example | 0.8500 | 0.0300 | 0.0900 | 0.0300 | 0.0000 | 0.0000 | Ti | 460 | 60 | 550 | 60 | 600 | 60 |
| 72-7 | Example | 0.8460 | 0.0340 | 0.0900 | 0.0300 | 0.0000 | 0.0000 | Ti | 470 | 60 | 550 | 60 | 600 | 60 |
| 73-7 | Example | 0.8450 | 0.0350 | 0.0900 | 0.0300 | 0.0000 | 0.0000 | Ti | 470 | 60 | 550 | 60 | 600 | 60 |
| 74-7 | Example | 0.8350 | 0.0450 | 0.0900 | 0.0300 | 0.0000 | 0.0000 | Ti | 480 | 60 | 550 | 60 | 600 | 60 |
| 1-7 | Example | 0.8200 | 0.0600 | 0.0900 | 0.0300 | 0.0000 | 0.0000 | Ti | 490 | 60 | 550 | 60 | 600 | 60 |
| 71-8 | Example | 0.8500 | 0.0300 | 0.0900 | 0.0300 | 0.0000 | 0.0000 | W | 460 | 60 | 550 | 60 | 600 | 60 |
| 72-8 | Example | 0.8460 | 0.0340 | 0.0900 | 0.0300 | 0.0000 | 0.0000 | W | 470 | 60 | 550 | 60 | 600 | 60 |
| 73-8 | Example | 0.8450 | 0.0350 | 0.0900 | 0.0300 | 0.0000 | 0.0000 | W | 470 | 60 | 550 | 60 | 600 | 60 |
| 74-8 | Example | 0.8350 | 0.0450 | 0.0900 | 0.0300 | 0.0000 | 0.0000 | W | 480 | 60 | 550 | 60 | 600 | 60 |
| 55 | Example | 0.8200 | 0.0600 | 0.0900 | 0.0300 | 0.0000 | 0.0000 | W | 490 | 60 | 550 | 60 | 600 | 60 |
| 75-8 | Example | 0.8100 | 0.0700 | 0.0900 | 0.0300 | 0.0000 | 0.0000 | W | 500 | 60 | 550 | 60 | 600 | 60 |
| 71-9 | Example | 0.8500 | 0.0300 | 0.0900 | 0.0300 | 0.0000 | 0.0000 | $Nb_{0.5}Hf_{0.5}$ | 460 | 60 | 550 | 60 | 600 | 60 |
| 72-9 | Example | 0.8460 | 0.0340 | 0.0900 | 0.0300 | 0.0000 | 0.0000 | $Nb_{0.5}Hf_{0.5}$ | 470 | 60 | 550 | 60 | 600 | 60 |
| 73-9 | Example | 0.8450 | 0.0350 | 0.0900 | 0.0300 | 0.0000 | 0.0000 | $Nb_{0.5}Hf_{0.5}$ | 470 | 60 | 550 | 60 | 600 | 60 |
| 74-9 | Example | 0.8350 | 0.0450 | 0.0900 | 0.0300 | 0.0000 | 0.0000 | $Nb_{0.5}Hf_{0.5}$ | 480 | 60 | 550 | 60 | 600 | 60 |
| 56 | Example | 0.8200 | 0.0600 | 0.0900 | 0.0300 | 0.0000 | 0.0000 | $Nb_{0.5}Hf_{0.5}$ | 490 | 60 | 550 | 60 | 600 | 60 |
| 75-9 | Example | 0.8100 | 0.0700 | 0.0900 | 0.0300 | 0.0000 | 0.0000 | $Nb_{0.5}Hf_{0.5}$ | 500 | 60 | 550 | 60 | 600 | 60 |
| 76-9 | Example | 0.7800 | 0.1000 | 0.0900 | 0.0300 | 0.0000 | 0.0000 | $Nb_{0.5}Hf_{0.5}$ | 520 | 60 | 570 | 60 | 630 | 60 |

| Sample No. | Example/ Comparative Example | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|
| 71-6 | Example | 51 | 8.5 | 7.4 | 13.9 | 8.3 | B |
| 72-6 | Example | 50 | 7.4 | 7.7 | 13.1 | 7.6 | B |
| 73-6 | Example | 50 | 7.7 | 6.1 | 12.1 | 6.8 | A |
| 74-6 | Example | 49 | 6.8 | 6.5 | 11.2 | 5.6 | A+ |
| 54 | Example | 48 | 6.8 | 6.2 | 12.4 | 4.1 | A+ |
| 71-7 | Example | 52 | 7.7 | 7.8 | 13.9 | 8.3 | B |
| 72-7 | Example | 51 | 7.2 | 7.1 | 13.1 | 7.6 | B |
| 73-7 | Example | 51 | 7.2 | 6.5 | 12.1 | 6.8 | A |
| 74-7 | Example | 48 | 6.5 | 6.2 | 11.2 | 5.6 | A+ |
| 1-7 | Example | 47 | 6.7 | 5.7 | 10.8 | 5.6 | A+ |
| 71-8 | Example | 52 | 7.2 | 7.5 | 14.1 | 9.3 | B |
| 72-8 | Example | 50 | 8.0 | 7.6 | 13.4 | 8.8 | B |
| 73-8 | Example | 48 | 7.2 | 7.0 | 12.9 | 6.7 | A |
| 74-8 | Example | 49 | 6.2 | 5.9 | 12.1 | 5.9 | A+ |

TABLE 5B-continued

| | | | | | | | |
|---|---|---|---|---|---|---|---|
| 55 | Example | 49 | 7.1 | 6.7 | 11.9 | 4.3 | A+ |
| 75-8 | Example | 46 | 6.1 | 5.1 | 10.9 | 5.6 | A+ |
| 71-9 | Example | 56 | 8.4 | 6.3 | 14.2 | 10.2 | B |
| 72-9 | Example | 52 | 7.5 | 6.4 | 13.5 | 9.1 | B |
| 73-9 | Example | 51 | 6.1 | 6.5 | 12.7 | 6.5 | A |
| 74-9 | Example | 50 | 6.9 | 5.8 | 11.3 | 5.3 | A+ |
| 56 | Example | 47 | 7.0 | 6.5 | 11.4 | 4.2 | A+ |
| 75-9 | Example | 59 | 6.2 | 5.2 | 8.6 | 4.7 | A+ |
| 76-9 | Example | 45 | 6.3 | 6.8 | 7.7 | 5.3 | A+ |

TABLE 6

| Sample | Example/ Comparative | $Fe_{(1-(a+b+c+d+e))}M_aB_bP_cSi_dCu_e$ | | | | | | | Heat treatment condition | | | | | |
|---|---|---|---|---|---|---|---|---|---|---|---|---|---|---|
| | | | | | | | | | First stage | | Second stage | | Third stage | |
| | | | | | | | | | $T_{1st}$ | Retention time | $T_{2nd}$ | Retention time | $T_{3rd}$ | Retention time |
| No. | Example | Fe | a | b | c | d | e | M | ° C. | min | ° C. | min | ° C. | min |
| 78 | Example | 0.8000 | 0.0600 | 0.1400 | 0.0000 | 0.0000 | 0.0000 | Nb | 510 | 60 | 550 | 60 | 600 | 60 |
| 79 | Example | 0.8000 | 0.0600 | 0.1399 | 0.0001 | 0.0000 | 0.0000 | Nb | 510 | 60 | 550 | 60 | 600 | 60 |
| 80 | Example | 0.8000 | 0.0600 | 0.1350 | 0.0050 | 0.0000 | 0.0000 | Nb | 510 | 60 | 550 | 60 | 600 | 60 |
| 81 | Example | 0.8000 | 0.0600 | 0.1300 | 0.0100 | 0.0000 | 0.0000 | Nb | 510 | 60 | 550 | 60 | 600 | 60 |
| 67 | Example | 0.8000 | 0.0600 | 0.1100 | 0.0300 | 0.0000 | 0.0000 | Nb | 510 | 60 | 550 | 60 | 600 | 60 |
| 82 | Example | 0.8000 | 0.0600 | 0.0900 | 0.0500 | 0.0000 | 0.0000 | Nb | 510 | 60 | 550 | 60 | 600 | 60 |
| 83 | Example | 0.8000 | 0.0600 | 0.0800 | 0.0600 | 0.0000 | 0.0000 | Nb | 510 | 60 | 550 | 60 | 600 | 60 |
| 84 | Example | 0.8000 | 0.0600 | 0.0700 | 0.0700 | 0.0000 | 0.0000 | Nb | 510 | 60 | 550 | 60 | 600 | 60 |
| 85 | Example | 0.8500 | 0.0600 | 0.0900 | 0.0000 | 0.0000 | 0.0000 | Nb | 470 | 60 | 550 | 60 | 600 | 60 |
| 86 | Example | 0.8360 | 0.0600 | 0.0900 | 0.0001 | 0.0000 | 0.0000 | Nb | 480 | 60 | 550 | 60 | 600 | 60 |
| 87 | Example | 0.8350 | 0.0600 | 0.0900 | 0.0050 | 0.0000 | 0.0000 | Nb | 480 | 60 | 550 | 60 | 600 | 60 |
| 88 | Example | 0.8250 | 0.0600 | 0.0900 | 0.0100 | 0.0000 | 0.0000 | Nb | 490 | 60 | 550 | 60 | 600 | 60 |
| 1 | Example | 0.8200 | 0.0600 | 0.0900 | 0.0300 | 0.0000 | 0.0000 | Nb | 490 | 60 | 550 | 60 | 600 | 60 |
| 89 | Example | 0.8000 | 0.0600 | 0.0900 | 0.0500 | 0.0000 | 0.0000 | Nb | 500 | 60 | 550 | 60 | 600 | 60 |
| 90 | Example | 0.7700 | 0.0600 | 0.0900 | 0.0600 | 0.0000 | 0.0000 | Nb | 510 | 60 | 570 | 60 | 630 | 60 |
| 91 | Example | 0.7500 | 0.0600 | 0.0900 | 0.0700 | 0.0000 | 0.0000 | Nb | 520 | 60 | 570 | 60 | 630 | 60 |

| Sample No. | Example/ Comparative Example | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|
| 78 | Example | 46 | 8.9 | 9.3 | 13.2 | 13.9 | C |
| 79 | Example | 48 | 8.1 | 7.8 | 13.3 | 4.9 | A+ |
| 80 | Example | 47 | 7.9 | 7.9 | 13.4 | 4.7 | A+ |
| 81 | Example | 48 | 7.7 | 6.7 | 13.1 | 3.9 | A+ |
| 67 | Example | 47 | 7.1 | 6.4 | 13.1 | 3.5 | A+ |
| 82 | Example | 48 | 7.5 | 7.0 | 12.9 | 3.8 | A+ |
| 83 | Example | 49 | 7.4 | 6.9 | 13.0 | 4.8 | A+ |
| 84 | Example | 47 | 8.5 | 8.8 | 13.2 | 8.2 | B |
| 85 | Example | 47 | 8.1 | 9.0 | 12.8 | 11.1 | C |
| 86 | Example | 50 | 8.9 | 8.2 | 13.1 | 4.6 | A+ |
| 87 | Example | 50 | 7.9 | 7.9 | 12.8 | 4.1 | A+ |
| 88 | Example | 49 | 7.3 | 6.6 | 12.9 | 3.7 | A+ |
| 1 | Example | 49 | 6.9 | 6.1 | 12.9 | 3.2 | A+ |
| 89 | Example | 47 | 7.4 | 7.5 | 12.9 | 3.8 | A+ |
| 90 | Example | 47 | 7.8 | 8.8 | 12.7 | 4.3 | A+ |
| 91 | Example | 49 | 8.0 | 9.1 | 13.1 | 7.3 | B |

TABLE 7

| Sample No. | Example/ Comparative Example | $Fe_{(1-(a+b+c+d+e))}M_aB_bP_cSi_dCu_e$ Fe | a | b | c | d | e | M | Heat treatment condition First stage $T_{1st}$ ° C. | Retention time min | Second stage $T_{2nd}$ ° C. | Retention time min | Third stage $T_{3rd}$ ° C. | Retention time min |
|---|---|---|---|---|---|---|---|---|---|---|---|---|---|---|
| 92 | Example | 0.8300 | 0.0600 | 0.0800 | 0.0300 | 0.0000 | 0.0000 | Nb | 480 | 60 | 550 | 60 | 600 | 60 |
| 93 | Example | 0.8299 | 0.0600 | 0.0800 | 0.0300 | 0.0000 | 0.0001 | Nb | 470 | 60 | 550 | 60 | 600 | 60 |
| 94 | Example | 0.8290 | 0.0600 | 0.0800 | 0.0300 | 0.0000 | 0.0010 | Nb | 460 | 60 | 550 | 60 | 600 | 60 |
| 1a | Example | 0.8250 | 0.0600 | 0.0800 | 0.0300 | 0.0000 | 0.0050 | Nb | 460 | 60 | 550 | 60 | 600 | 60 |
| 95 | Example | 0.8230 | 0.0600 | 0.0800 | 0.0300 | 0.0000 | 0.0070 | Nb | 450 | 60 | 550 | 60 | 600 | 60 |
| 96 | Example | 0.8200 | 0.0600 | 0.0800 | 0.0300 | 0.0000 | 0.0100 | Nb | 450 | 60 | 550 | 60 | 600 | 60 |
| 96a | Example | 0.8150 | 0.0600 | 0.0800 | 0.0300 | 0.0000 | 0.0150 | Nb | 440 | 60 | 550 | 60 | 600 | 60 |
| 96b | Example | 0.8130 | 0.0600 | 0.0800 | 0.0300 | 0.0000 | 0.0170 | Nb | 440 | 60 | 550 | 60 | 600 | 60 |
| 97 | Example | 0.8100 | 0.0600 | 0.0800 | 0.0300 | 0.0000 | 0.0200 | Nb | 430 | 60 | 550 | 60 | 600 | 60 |
| 97a | Example | 0.8050 | 0.0600 | 0.0800 | 0.0300 | 0.0000 | 0.0250 | Nb | 430 | 60 | 550 | 60 | 600 | 60 |
| 97b | Example | 0.8000 | 0.0600 | 0.0800 | 0.0300 | 0.0000 | 0.0300 | Nb | 420 | 60 | 550 | 60 | 600 | 60 |
| 97c | Example | 0.7900 | 0.0600 | 0.0800 | 0.0300 | 0.0000 | 0.0400 | Nb | 410 | 60 | 550 | 60 | 600 | 60 |

| Sample No. | Example/ Comparative Example | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|
| 92 | Example | 55 | 7.4 | 6.5 | 12.2 | 7.4 | B |
| 93 | Example | 53 | 5.8 | 5.7 | 10.6 | 6.8 | A |
| 94 | Example | 55 | 5.3 | 4.9 | 9.4 | 6.2 | A |
| 1a | Example | 54 | 4.7 | 4.2 | 8.1 | 6.0 | A |
| 95 | Example | 51 | 4.9 | 5.1 | 7.9 | 6.3 | A |
| 96 | Example | 49 | 5.2 | 4.7 | 7.7 | 6.5 | A |
| 96a | Example | 48 | 5.4 | 4.9 | 7.5 | 6.3 | A |
| 96b | Example | 50 | 5.8 | 5.2 | 7.2 | 6.4 | A |
| 97 | Example | 49 | 6.3 | 6.6 | 7.2 | 6.6 | A |
| 97a | Example | 52 | 6.2 | 6.4 | 7.3 | 6.8 | A |
| 97b | Example | 51 | 6.0 | 6.6 | 7.1 | 6.9 | A |
| 97c | Example | 54 | 6.1 | 5.9 | 6.9 | 12.9 | C |

TABLE 8

| Sample No. | Example/ Comparative Example | Heat treatment condition First stage $T_{1st}$ ° C. | Retention time min | Second stage $T_{2nd}$ ° C. | Retention time min | Third stage $T_{3rd}$ ° C. | Retention time min | Room temperature to $T_{1st}$ heating rate ° C./min | $T_{1st}$ to $T_{2nd}$ heating rate ° C./min |
|---|---|---|---|---|---|---|---|---|---|
| 3 | Example | 530 | 60 | 550 | 60 | 600 | 60 | 10 | 10 |
| 98 | Example | 520 | 60 | 550 | 60 | 600 | 60 | 10 | 10 |
| 99 | Example | 540 | 60 | 550 | 60 | 600 | 60 | 10 | 10 |
| 100 | Example | 530 | 60 | 540 | 60 | 600 | 60 | 10 | 10 |
| 101 | Example | 530 | 60 | 590 | 60 | 600 | 60 | 10 | 10 |
| 102 | Example | 520 | 60 | 590 | 60 | 600 | 60 | 10 | 10 |
| 103 | Example | 540 | 60 | 590 | 60 | 600 | 60 | 10 | 10 |
| 104 | Example | 520 | 60 | 530 | 60 | 600 | 60 | 10 | 10 |
| 105 | Example | 530 | 10 | 550 | 60 | 600 | 60 | 10 | 10 |
| 106 | Example | 530 | 180 | 550 | 60 | 600 | 60 | 10 | 10 |
| 107 | Example | 530 | 60 | 550 | 10 | 600 | 60 | 10 | 10 |
| 108 | Example | 530 | 60 | 550 | 180 | 600 | 60 | 10 | 10 |
| 109 | Example | 530 | 60 | 550 | 60 | 600 | 10 | 10 | 10 |
| 110 | Example | 530 | 60 | 550 | 60 | 600 | 180 | 10 | 10 |
| 111 | Example | 530 | 10 | 550 | 10 | 600 | 10 | 10 | 10 |
| 112 | Example | 530 | 180 | 550 | 180 | 600 | 180 | 10 | 10 |
| 113 | Example | 530 | 60 | 550 | 60 | 600 | 60 | 1 | 10 |
| 114 | Example | 530 | 60 | 550 | 60 | 600 | 60 | 100 | 10 |
| 115 | Example | 530 | 60 | 550 | 60 | 600 | 60 | 10 | 1 |
| 116 | Example | 530 | 60 | 550 | 60 | 600 | 60 | 10 | 100 |
| 117 | Example | 530 | 60 | 550 | 60 | 600 | 60 | 10 | 10 |
| 118 | Example | 530 | 60 | 550 | 60 | 600 | 60 | 10 | 10 |
| 119 | Example | 530 | 60 | 550 | 60 | 600 | 60 | 1 | 1 |
| 120 | Example | 530 | 60 | 550 | 60 | 600 | 60 | 100 | 100 |
| 121 | Comparative | 550 | 60 | — | — | — | — | 10 | — |

TABLE 8-continued

| | | | | | | | | | |
|---|---|---|---|---|---|---|---|---|---|
| | Example | | | | | | | | |
| 122 | Comparative Example | 530 | 60 | 540 | 10 | — | — | 10 | 10 |
| 123 | Comparative Example | 530 | 60 | 550 | 60 | 630 | 60 | 10 | 10 |
| 124 | Comparative Example | 530 | 30 | — | — | — | — | 10 | — |
| 125 | Comparative Example | 530 | 10 | 600 | 60 | — | — | 10 | 1.04 |

| Sample No. | Example/ Comparative Example | $T_{2nd}$ to $T_{3rd}$ heating rate ° C./min | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|
| 3 | Example | 10 | 56 | 6.3 | 5.9 | 22.4 | 11.2 | C |
| 98 | Example | 10 | 54 | 5.5 | 5.2 | 23.8 | 12.4 | C |
| 99 | Example | 10 | 55 | 5.4 | 8.0 | 20.8 | 12.3 | C |
| 100 | Example | 10 | 57 | 5.1 | 7.9 | 19.6 | 13.9 | C |
| 101 | Example | 10 | 54 | 7.6 | 6.0 | 19.4 | 12.7 | C |
| 102 | Example | 10 | 54 | 6.4 | 7.0 | 21.0 | 11.9 | C |
| 103 | Example | 10 | 54 | 6.7 | 7.3 | 21.8 | 11.1 | C |
| 104 | Example | 10 | 55 | 6.4 | 7.2 | 19.9 | 12.3 | C |
| 105 | Example | 10 | 52 | 5.7 | 5.3 | 19.8 | 11.6 | C |
| 106 | Example | 10 | 57 | 7.4 | 7.0 | 19.1 | 11.9 | C |
| 107 | Example | 10 | 54 | 5.3 | 5.8 | 19.5 | 12.2 | C |
| 108 | Example | 10 | 55 | 7.9 | 7.4 | 19.7 | 13.2 | C |
| 109 | Example | 10 | 52 | 6.0 | 5.7 | 20.2 | 14.2 | C |
| 110 | Example | 10 | 57 | 5.1 | 5.8 | 20.6 | 13.5 | C |
| 111 | Example | 10 | 54 | 6.5 | 7.0 | 20.9 | 15.8 | C |
| 112 | Example | 10 | 58 | 5.8 | 7.3 | 20.5 | 12.2 | C |
| 113 | Example | 10 | 56 | 7.2 | 5.0 | 23.2 | 11.9 | C |
| 114 | Example | 10 | 56 | 7.0 | 5.1 | 22.1 | 14.2 | C |
| 115 | Example | 10 | 54 | 6.5 | 7.1 | 21.0 | 12.3 | C |
| 116 | Example | 10 | 53 | 6.8 | 5.4 | 21.8 | 13.3 | C |
| 117 | Example | 1 | 54 | 7.3 | 6.0 | 23.4 | 13.9 | C |
| 118 | Example | 100 | 55 | 6.5 | 6.2 | 19.5 | 16.1 | C |
| 119 | Example | 1 | 54 | 7.9 | 6.7 | 19.3 | 13.0 | C |
| 120 | Example | 100 | 53 | 6.2 | 7.4 | 19.2 | 15.8 | C |
| 121 | Comparative Example | — | 38 | 11.7 | 11.1 | 10.5 | 98.2 | D |
| 122 | Comparative Example | — | 39 | 11.6 | 11.8 | 11.7 | 92.1 | D |
| 123 | Comparative Example | 10 | 57 | 2.5 | 4.8 | 24.6 | 110.2 | D |
| 124 | Comparative Example | — | 31 | 13.4 | 14.3 | 5.4 | 121.4 | D |
| 125 | Comparative Example | — | 50 | 6.2 | 10.8 | 19.7 | 53.2 | D |

From Table 1, in each of sample Nos. 1a, 2a, 2b, and 1 to 3, a total area ratio of a crystallite, an average thickness of an amorphous phase, and a standard deviation of a thickness of the amorphous phase were all within predetermined ranges. As a result, the temperature properties of the core loss were good in all the samples. The temperature properties of the core loss of the sample Nos. 1, 2, and 2b were particularly good.

The sample No. 3 being small in content (a) of M had a deteriorated temperature property of the core loss compared with the sample Nos. 1, 1a, 2, 2a, and 2b.

Figure 4:
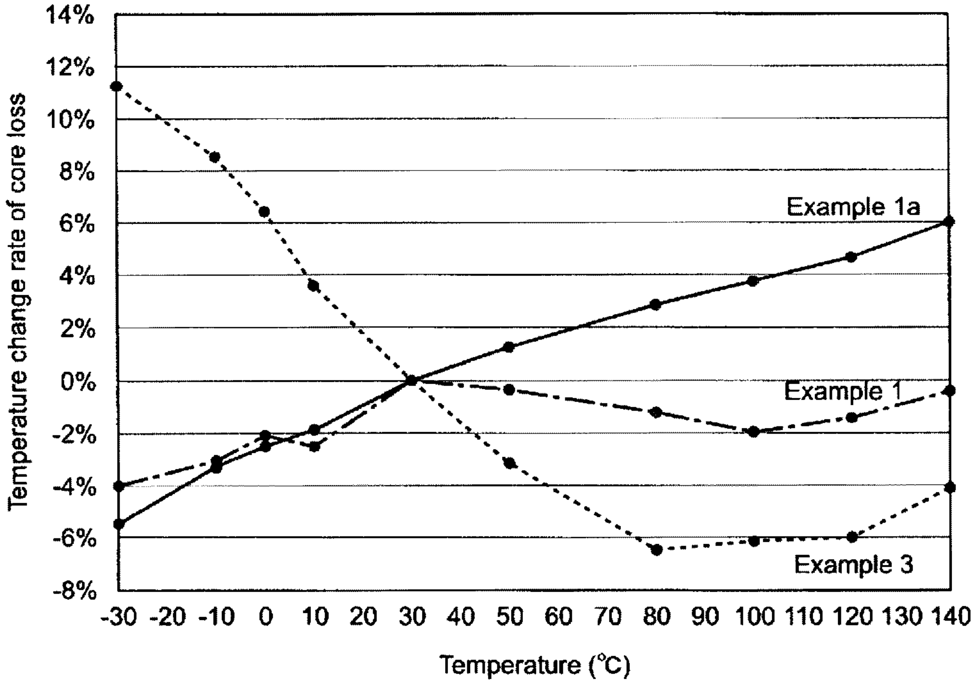
FIG. 4 is a graph showing a temperature change rate of core loss with respect to 30° C.

Regarding the sample Nos. 1, 1a, and 3, FIG. 4 is a graph showing a temperature change rate of the core loss with respect to 30° C. The sample No. 1, which includes 6.0 at % of M and does not include Si and Cu, had the highest core loss at 30° C. The sample No. 1a, which includes 6.0 at % of M and 0.5 at % of Cu and does not include Si, had a higher core loss as the temperature was higher. The sample No. 3, which includes 3.0 at % of M, 1.0 at % of Cu, and 13.5 at % of Si, had the lowest core loss at 80° C., and a higher core loss regardless of whether the temperature was lower or higher than 80° C.

Table 2 shows examples and comparative examples in which the composition was the same as that of the sample No. 1 and heat treatment conditions were changed. The sample Nos. 1 and 4 to 30, which were heat-treated at three stages, all had a good temperature property of core loss. The sample Nos. 1 and 5 to 30 had a particularly good temperature property of core loss.

On the other hand, in each of sample Nos. 31, 32, and 35 to 49, which were heat-treated at one stage or two stages, one or more of a total area ratio of a crystallite, an average thickness of an amorphous phase, and a standard deviation of a thickness of the amorphous phase were out of a predetermined range. As a result, temperature properties of core loss deteriorated.

Although the heat treatment was performed in three stages, in a sample No. 34 in which retention times in a second stage and a third stage were too long, an average thickness of an amorphous phase is too small, and a temperature property of core loss deteriorated. In addition, in a sample No. 33 in which $T_{3rd}$ was too high, a total area ratio of a crystallite was too large, and thus a temperature property of core loss deteriorated.

Table 3 shows examples carried out under the same conditions as the sample No. 1 except that a kind of M was changed. Sample Nos. 50 to 57 in which the kind of M was changed had good temperature properties of core loss as in the sample No. 1.

Table 4 shows examples and comparative examples in which the composition was the same as that of the sample No. 1 and each parameter was changed by changing heat treatment conditions.

A sample No. 58, a sample No. 59, and the sample No. 6 are examples carried out under the same conditions except for the retention time of the third stage. The shorter the retention time of the third stage, the lower the total area ratio of the crystallite, and the larger the average thickness of the amorphous phase and the standard deviation of the thickness of the amorphous phase.

The sample No. 1, a sample No. 60, the sample No. 4, and the sample No. 33 are examples and comparative examples carried out under the same conditions except for $T_{3rd}$. The lower the $T_{3rd}$, the lower the total area ratio of the crystallite, and the larger the average thickness of the amorphous phase and the standard deviation of the thickness of the amorphous phase.

Sample Nos. 61 to 70 in Table 5A are examples and comparative examples carried out under the same conditions except that the M content (a) and B content (b) were changed. The larger the M content and the smaller the B content, the smaller the total area ratio of the crystallite. In addition, the sample Nos. 65 to 69 in which the M content was 3.5 at % or more and 10 at % or less had better temperature properties of core loss than the sample Nos. 61 to 64 and 70 in which the M content was less than 3.5 at % or more than 10 at %.

Sample Nos. 71 to 77 in Table 5A are examples carried out under the same conditions except that the M content (a) and Fe content were changed from the sample No. 1. The larger the M content, the smaller the total area ratio of the crystallite. In addition, the sample Nos. 1 and 73 to 76 in which the content of M was 3.5 at % or more and 10 at % or less had better temperature properties of core loss than the sample Nos. 71, 72, and 77 in which the content of M was less than 3.5 at % or more than 10 at %. The sample Nos. 1 and 74 to 76 in which the M content is 4.5 at % or more and 10 at % or less had particularly good temperature properties of core loss.

The sample No. 50 and sample Nos. 71-2 to 76-2 in Table 5A are examples carried out under the same conditions except that the kind of M was changed from the sample Nos. 1 and 71 to 76. The sample No. 51 and sample Nos. 71-3 to 76-3 in Table 5A are examples carried out under the same conditions except that the kind of M was changed from the sample Nos. 1 and 71 to 76. The sample No. 52 and sample Nos. 71-4 to 76-4 in Table 5A are examples carried out under the same conditions except that the kind of M was changed from the sample Nos. 1 and 71 to 76. The sample No. 53 and sample Nos. 71-5 to 74-5 in Table 5A are examples carried out under the same conditions except that the kind of M was changed from the sample Nos. 1 and 71 to 74. The sample No. 54 and sample Nos. 71-6 to 74-6 in Table 5B are examples carried out under the same conditions except that the kind of M was changed from the sample Nos. 1 and 71 to 74. A sample No. 1-7 and sample Nos. 71-7 to 74-7 in Table 5B are examples carried out under the same conditions except that the kind of M was changed from the sample Nos. 1 and 71 to 74. The sample No. 55 and sample Nos. 71-8 to 75-8 in Table 5B are examples carried out under the same conditions except that the kind of M was changed from the sample Nos. 1 and 71 to 75. The sample No. 56 and sample Nos. 71-9 to 76-9 in Table 5B are examples carried out under the same conditions except that the kind of M was changed from the sample Nos. 1 and 71 to 76.

From Tables 5A and 5B, the temperature properties of the core loss were the same as long as the other conditions were not changed even if the kind of M was changed.

Sample Nos. 78 to 84 in Table 6 are examples carried out under the same conditions except that the B content (b) and P content (c) were changed from the sample No. 67. The sample Nos. 67 and 79 to 83, in which the P content is more than 0 and 6.0 at % or less, had a better temperature property of core loss than the sample No. 78, in which no P is included, and the sample No. 84, in which the P content exceeds 6.0 at %.

Sample Nos. 85 to 91 in Table 6 are examples carried out under the same conditions except that the P content (c) and the Fe content were changed from the sample No. 1. The sample Nos. 1 and 86 to 90, in which the P content is more than 0 and 6.0 at % or less, had a better temperature property of core loss than the sample No. 85, in which no P is included, and the sample No. 91, in which the P content exceeds 6.0 at %.

Table 7 shows examples carried out under the same conditions except that $T_{1st}$ was changed because Tx1 was changed in accordance with a change in the Fe content and Cu content in the sample No. 1a. The larger the Cu content (e), the smaller an average grain size of the crystallite. In addition, the sample No. 1a and sample Nos. 92 to 97, 96a, 96b, 97a, and 97b, in which the content of Cu was 0 or more and 3.0 at % or less had better temperature properties of core loss than a sample No. 97c in which the Cu content exceeds 3.0 at %.

Table 8 shows examples and comparative examples in which the composition was the same as that of the sample No. 3 and the heat treatment conditions were changed. The sample No. 3 and sample Nos. 98 to 120, which were heat-treated at the three stages, all had good temperature properties of core loss.

On the other hand, in each of sample Nos. 121, 122, 124, and 125, which were heat-treated at one stage or two stages, one or more of a total area ratio of a crystallite, an average thickness of an amorphous phase, and a standard deviation of a thickness of the amorphous phase were out of the predetermined range. As a result, temperature properties of core loss deteriorated.

Although the heat treatment was performed in three stages, a temperature property of core loss of a sample No. 123 deteriorated because an average thickness of an amorphous phase of the sample No. 123 in which $T_{3rd}$ was too high was too small.

Experimental Example 2

A procedure was carried out under the same conditions as the sample No. 61 except that a heating rate was increased and a retention time was shortened. Results are shown in Table 9.

TABLE 9

| Sample No. | Example/ Comparative Example | Heat treatment condition: First stage $T_{1st}$ ° C. | Retention time min | Second stage $T_{2nd}$ ° C. | Retention time min | Third stage $T_{3rd}$ ° C. | Retention time min | Room temperature to $T_{1st}$ heating rate ° C./min | $T_{1st}$ to $T_{2nd}$ heating rate ° C./min |
|---|---|---|---|---|---|---|---|---|---|
| 61 | Comparative Example | 490 | 60 | 520 | 60 | 550 | 60 | 10 | 10 |
| 126 | Example | 490 | 1 | 520 | 1 | 550 | 1 | 100 | 100 |

| Sample No. | Example/ Comparative Example | $T_{2nd}$ to $T_{3rd}$ heating rate ° C./min | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|
| 61 | Comparative Example | 10 | 73 | 2.8 | 6.4 | 46.9 | 96.3 | D |
| 126 | Example | 100 | 43 | 7.4 | 8.3 | 14.2 | 6.9 | A |

From Table 9, even when M was not included, a total area ratio of a crystallite, an average thickness of an amorphous phase, and a standard deviation of a thickness of the amorphous phase were all within predetermined ranges by suitably controlling heat treatment conditions. As a result, a temperature property of core loss could be evaluated as good even when M was not included.

Experimental Example 3

Sample Nos. 127 to 155 were carried out with the same composition except that ⅕ of Fe in an atomic number ratio of the sample No. 1a was replaced with Co. That is, the sample Nos. 127 to 155 were carried out with the same composition as the sample No. 1a except that $\alpha=0.2000$ was satisfied. In addition, the sample Nos. 127 to 155 were carried out under heat treatment conditions shown in Table 10. Results are shown in Table 10.

TABLE 10

| Sample No. | Example/ Comparative Example | Heat treatment condition: First stage $T_{1st}$ ° C. | Retention time min | Second stage $T_{2nd}$ ° C. | Retention time min | Third stage $T_{3rd}$ ° C. | Retention time min | Room temperature to $T_{1st}$ heating rate ° C./min | $T_{1st}$ to $T_{2nd}$ heating rate ° C./min |
|---|---|---|---|---|---|---|---|---|---|
| 1a | Example | 460 | 60 | 550 | 60 | 600 | 60 | 10 | 10 |
| 127 | Example | 450 | 60 | 550 | 60 | 600 | 60 | 10 | 10 |
| 128 | Example | 440 | 60 | 550 | 60 | 600 | 60 | 10 | 10 |
| 129 | Example | 460 | 60 | 550 | 60 | 600 | 60 | 10 | 10 |
| 130 | Example | 450 | 60 | 540 | 60 | 600 | 60 | 10 | 10 |
| 131 | Example | 450 | 60 | 590 | 60 | 600 | 60 | 10 | 10 |
| 132 | Example | 440 | 60 | 590 | 60 | 600 | 60 | 10 | 10 |
| 133 | Example | 460 | 60 | 590 | 60 | 600 | 60 | 10 | 10 |
| 134 | Example | 440 | 60 | 530 | 60 | 600 | 60 | 10 | 10 |
| 135 | Example | 450 | 10 | 550 | 60 | 600 | 60 | 10 | 10 |
| 136 | Example | 450 | 180 | 550 | 60 | 600 | 60 | 10 | 10 |
| 137 | Example | 450 | 60 | 550 | 10 | 600 | 60 | 10 | 10 |
| 138 | Example | 450 | 60 | 550 | 180 | 600 | 60 | 10 | 10 |
| 139 | Example | 450 | 60 | 550 | 60 | 600 | 10 | 10 | 10 |
| 140 | Example | 450 | 60 | 550 | 60 | 600 | 180 | 10 | 10 |
| 141 | Example | 450 | 10 | 550 | 10 | 600 | 10 | 10 | 10 |
| 142 | Example | 450 | 180 | 550 | 180 | 600 | 180 | 10 | 10 |
| 143 | Example | 450 | 60 | 550 | 60 | 600 | 60 | 1 | 10 |
| 144 | Example | 450 | 60 | 550 | 60 | 600 | 60 | 100 | 10 |
| 145 | Example | 450 | 60 | 550 | 60 | 600 | 60 | 10 | 1 |
| 146 | Example | 450 | 60 | 550 | 60 | 600 | 60 | 10 | 100 |
| 147 | Example | 450 | 60 | 550 | 60 | 600 | 60 | 10 | 10 |
| 148 | Example | 450 | 60 | 550 | 60 | 600 | 60 | 10 | 10 |
| 149 | Example | 450 | 60 | 550 | 60 | 600 | 60 | 1 | 1 |
| 150 | Example | 450 | 60 | 550 | 60 | 600 | 60 | 100 | 100 |
| 151 | Comparative Example | 450 | 60 | — | — | — | — | 10 | — |
| 152 | Comparative Example | 450 | 60 | 540 | 10 | — | — | 10 | 10 |
| 153 | Comparative Example | 450 | 60 | 550 | 60 | 630 | 60 | 10 | 10 |

TABLE 10-continued

| | | | | | | | | | |
|---|---|---|---|---|---|---|---|---|---|
| 154 | Comparative Example | 450 | 30 | — | — | — | — | 10 | — |
| 155 | Comparative Example | 450 | 10 | 600 | 60 | — | — | 10 | 1.04 |

| Sample No. | Example/ Comparative Example | $T_{2nd}$ to $T_{3rd}$ heating rate ° C./min | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|
| 1a | Example | 10 | 54 | 4.7 | 4.2 | 8.1 | 6.0 | A |
| 127 | Example | 10 | 55 | 4.7 | 3.9 | 8.7 | 2.1 | A+ |
| 128 | Example | 10 | 52 | 4.6 | 4.4 | 9.2 | 3.2 | A+ |
| 129 | Example | 10 | 57 | 4.3 | 5.6 | 8.8 | 3.9 | A+ |
| 130 | Example | 10 | 53 | 5.1 | 4.4 | 9.1 | 3.3 | A+ |
| 131 | Example | 10 | 55 | 7.1 | 4.9 | 9.5 | 3.6 | A+ |
| 132 | Example | 10 | 52 | 5.2 | 4.9 | 9.4 | 4.4 | A+ |
| 133 | Example | 10 | 52 | 5.3 | 4.4 | 8.8 | 4.0 | A+ |
| 134 | Example | 10 | 57 | 6.0 | 5.2 | 8.9 | 3.1 | A+ |
| 135 | Example | 10 | 53 | 5.2 | 4.1 | 8.7 | 2.6 | A+ |
| 136 | Example | 10 | 54 | 6.2 | 4.6 | 9.5 | 4.1 | A+ |
| 137 | Example | 10 | 57 | 4.8 | 4.5 | 9.1 | 3.3 | A+ |
| 138 | Example | 10 | 53 | 5.6 | 4.8 | 10.0 | 4.3 | A+ |
| 139 | Example | 10 | 52 | 6.0 | 4.5 | 9.4 | 3.2 | A+ |
| 140 | Example | 10 | 53 | 5.4 | 4.4 | 9.7 | 4.1 | A+ |
| 141 | Example | 10 | 51 | 5.3 | 4.7 | 9.1 | 3.7 | A+ |
| 142 | Example | 10 | 53 | 4.5 | 4.6 | 9.0 | 3.6 | A+ |
| 143 | Example | 10 | 51 | 6.1 | 4.6 | 8.9 | 3.8 | A+ |
| 144 | Example | 10 | 58 | 5.2. | 5.5 | 8.8 | 3.0 | A+ |
| 145 | Example | 10 | 57 | 5.4 | 4.6 | 9.3 | 4.2 | A+ |
| 146 | Example | 10 | 56 | 5.7 | 4.1 | 10.1 | 4.2 | A+ |
| 147 | Example | 1 | 58 | 0.4 | 4.6 | 9.8 | 3.7 | A+ |
| 148 | Example | 100 | 58 | 5.0 | 4.2 | 8.7 | 2.9 | A+ |
| 149 | Example | 1 | 55 | 5.1 | 4.9 | 9.0 | 3.2 | A+ |
| 150 | Example | 100 | 55 | 5.6 | 5.1 | 9.4 | 3.6 | A+ |
| 151 | Comparative Example | — | 36 | 13.0 | 11.5 | 4.8 | 99.3 | D |
| 152 | Comparative Example | — | 37 | 11.5 | 14.4 | 4.1 | 100.2 | D |
| 153 | Comparative Example | 10 | 56 | 2.1 | 4.1 | 18.2 | 121.3 | D |
| 154 | Comparative Example | — | 29 | 12.1 | 14.2 | 3.8 | 119.2 | D |
| 155 | Comparative Example | — | 51 | 6.1 | 13 | 8.7 | 68.3 | D |

From Table 10, all of the sample Nos. 127 to 150 that were heat-treated in three stages had good temperature properties of core loss.

On the other hand, in each of sample Nos. 151, 152, 154, and 155, which were heat-treated at one stage or two stages, one or more of a total area ratio of a crystallite, an average thickness of an amorphous phase, and a standard deviation of a thickness of the amorphous phase were out of a predetermined range. As a result, temperature properties of core loss deteriorated.

Although the heat treatment was performed in the three stages, a temperature property of core loss of a sample No. 153 deteriorated because a total area ratio of a crystallite of the sample No. 153 in which $T_{3rd}$ was too high was too large.

In addition, each example including Co had a better temperature property of core loss than the sample No. 1a including no Co.

Experimental Example 4

Sample Nos. 156 to 166 were carried out under the same conditions except that a content ratio of Fe and Co was changed for the sample No. 127. Results are shown in Table 11. Heat treatment conditions of the sample No. 1a and the sample Nos. 127 and 156 to 166 are the same except that $T_{1st}$ of the sample No. 1a is 460° C. and $T_{1st}$ of the sample Nos. 127 and 156 to 166 is 450° C.

TABLE 11

| Sample No. | Example/Comparative Example | $(Fe_{(1-\alpha)}(Co_{\alpha})_{(1-(a+b+c+d+e))}M_aB_bP_cSi_dCu_e$ 1-α | α | a | b | c | d | e | M | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|---|---|---|---|---|---|
| 1a | Example | 1.0000 | 0.0000 | 0.0600 | 0.0800 | 0.0300 | 0.0000 | 0.0050 | Nb | 54 | 4.7 | 4.2 | 8.1 | 6.0 | A |
| 156 | Example | 0.9950 | 0.0050 | 0.0600 | 0.0800 | 0.0300 | 0.0000 | 0.0050 | Nb | 52 | 4.7 | 4.2 | 8.3 | 5.8 | A+ |
| 157 | Example | 0.9900 | 0.0100 | 0.0600 | 0.0800 | 0.0300 | 0.0000 | 0.0050 | Nb | 53 | 5.5 | 5.2 | 9.7 | 5.5 | A+ |
| 158 | Example | 0.9800 | 0.0200 | 0.0600 | 0.0800 | 0.0300 | 0.0000 | 0.0050 | Nb | 51 | 5.1 | 4.8 | 9.3 | 4.9 | A+ |
| 159 | Example | 0.9500 | 0.0500 | 0.0600 | 0.0800 | 0.0300 | 0.0000 | 0.0050 | Nb | 51 | 4.9 | 4.1 | 9.1 | 4.5 | A+ |
| 160 | Example | 0.9200 | 0.0800 | 0.0600 | 0.0800 | 0.0300 | 0.0000 | 0.0050 | Nb | 52 | 4.8 | 4.0 | 9.1 | 3.8 | A+ |
| 161 | Example | 0.9000 | 0.1000 | 0.0600 | 0.0800 | 0.0300 | 0.0000 | 0.0050 | Nb | 51 | 4.8 | 4.0 | 8.9 | 3.4 | A+ |
| 127 | Example | 0.8000 | 0.2000 | 0.0600 | 0.0800 | 0.0300 | 0.0000 | 0.0050 | Nb | 55 | 4.7 | 3.9 | 8.7 | 2.1 | A+ |
| 162 | Example | 0.7000 | 0.3000 | 0.0600 | 0.0800 | 0.0300 | 0.0000 | 0.0050 | Nb | 54 | 5.0 | 4.2 | 8.8 | 3.2 | A+ |
| 163 | Example | 0.6000 | 0.4000 | 0.0600 | 0.0800 | 0.0300 | 0.0000 | 0.0050 | Nb | 50 | 5.2 | 4.4 | 9.1 | 5.4 | A+ |
| 164 | Example | 0.5000 | 0.5000 | 0.0600 | 0.0800 | 0.0300 | 0.0000 | 0.0050 | Nb | 54 | 5.4 | 4.6 | 9.9 | 5.5 | A+ |
| 165 | Example | 0.4500 | 0.5500 | 0.0600 | 0.0800 | 0.0300 | 0.0000 | 0.0050 | Nb | 53 | 5.9 | 4.9 | 10.2 | 12.2 | C |
| 166 | Example | 0.4000 | 0.6000 | 0.0600 | 0.0800 | 0.0300 | 0.0000 | 0.0050 | Nb | 53 | 6.3 | 5.1 | 10.5 | 13.1 | C |

From Table 11, all of the sample Nos. 156 to 166 newly carried out in Experimental Example 4 had good temperature properties of core loss.

The sample Nos. 127 and 156 to 164, in which the Co content is more than 0 and equal to or less than the Fe content, had better temperature properties of core loss than the sample No. 1a, in which no Co is included, and the sample Nos. 165 and 166, in which the Co content exceeds the Fe content.

Experimental Example 5

Sample Nos. 167 to 175 were carried out under the same conditions except that a content ratio of Fe, Co, and Ni was changed for the sample No. 127. Results are shown in Table 12. Heat treatment conditions of all the examples shown in Table 12 are the same.

From Table 12, all of the sample Nos. 167 to 175 newly carried out in Experimental Example 5 had good temperature properties of core loss. Compared with the sample No. 175 including only Ni without including Co, the sample Nos. 127 and 167 to 174 had particularly good temperature properties of core loss.

Experimental Example 6

Sample Nos. 176 to 228 were carried out under the same conditions except that a content ratio of Fe and X2 and/or a kind of X2 were/was changed for the sample No. 1a. Results are shown in Tables 13A to 13D. Heat treatment conditions of all the examples shown in Tables 13A to 13D are the same.

TABLE 12

| Sample No. | Example/Comparative Example | $(Fe_{(1-\alpha)}(Co_{\alpha1}Ni_{\alpha2})_{(1-(a+b+c+d+e))}M_aB_bP_cSi_dCu_e$ 1-α | α1 | α2 | a | b | c | d | e | M | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|---|---|---|---|---|---|---|
| 127 | Example | 0.8000 | 0.2000 | 0.0000 | 0.0600 | 0.0800 | 0.0300 | 0.0000 | 0.0050 | Nb | 55 | 4.7 | 3.9 | 8.7 | 2.1 | A+ |
| 167 | Example | 0.7000 | 0.2000 | 0.1000 | 0.0600 | 0.0800 | 0.0300 | 0.0000 | 0.0050 | Nb | 53 | 5.1 | 4.7 | 8.8 | 3.2 | A+ |
| 168 | Example | 0.6000 | 0.2000 | 0.2000 | 0.0600 | 0.0800 | 0.0300 | 0.0000 | 0.0050 | Nb | 55 | 4.9 | 5.0 | 9.3 | 3.9 | A+ |
| 169 | Example | 0.5000 | 0.2000 | 0.3000 | 0.0600 | 0.0800 | 0.0300 | 0.0000 | 0.0050 | Nb | 52 | 4.8 | 4.6 | 10.2 | 5.8 | A+ |
| 170 | Example | 0.5000 | 0.1000 | 0.4000 | 0.0600 | 0.0800 | 0.0300 | 0.0000 | 0.0050 | Nb | 51 | 5.2 | 4.8 | 10.4 | 5.9 | A+ |
| 169 | Example | 0.5000 | 0.2000 | 0.3000 | 0.0600 | 0.0800 | 0.0300 | 0.0000 | 0.0050 | Nb | 52 | 4.8 | 4.6 | 10.2 | 5.8 | A+ |
| 171 | Example | 0.5000 | 0.3000 | 0.2000 | 0.0600 | 0.0800 | 0.0300 | 0.0000 | 0.0050 | Nb | 55 | 4.9 | 5.0 | 9.9 | 5.8 | A+ |
| 172 | Example | 0.5000 | 0.4000 | 0.1000 | 0.0600 | 0.0800 | 0.0300 | 0.0000 | 0.0050 | Nb | 53 | 5.4 | 4.9 | 10.2 | 5.7 | A+ |
| 173 | Example | 0.5000 | 0.4500 | 0.0500 | 0.0600 | 0.0800 | 0.0300 | 0.0000 | 0.0050 | Nb | 49 | 5.4 | 5.1 | 10.3 | 5.6 | A+ |
| 174 | Example | 0.5000 | 0.4900 | 0.0100 | 0.0600 | 0.0800 | 0.0300 | 0.0000 | 0.0050 | Nb | 51 | 5.6 | 4.7 | 10.1 | 5.7 | A+ |
| 164 | Example | 0.5000 | 0.5000 | 0.0000 | 0.0600 | 0.0800 | 0.0300 | 0.0000 | 0.0050 | Nb | 54 | 5.4 | 4.6 | 9.9 | 5.5 | A+ |
| 127 | Example | 0.8000 | 0.2000 | 0.0000 | 0.0600 | 0.0800 | 0.0300 | 0.0000 | 0.0050 | Nb | 55 | 4.7 | 3.9 | 8.7 | 2.1 | A+ |
| 175 | Example | 0.8000 | 0.0000 | 0.2000 | 0.0600 | 0.0800 | 0.0300 | 0.0000 | 0.0050 | Nb | 54 | 5.0 | 4.4 | 9.8 | 6.6 | A |

$*\alpha = \alpha1 + \alpha2$

TABLE 13A

| Sample No. | Example/Comparative Example | $(Fe_{(1-(\alpha+\beta))}X1_{\alpha}X2_{\beta})_{(1-(a+b+c+d+e))}M_aB_bP_cSi_dCu_e$ 1-(α + β) | α | β | a | b | c | d | e |
|---|---|---|---|---|---|---|---|---|---|
| 1a | Example | 1.0000 | 0.0000 | 0.0000 | 0.0600 | 0.0800 | 0.0300 | 0.0000 | 0.0050 |
| 176 | Example | 0.9950 | 0.0000 | 0.0050 | 0.0600 | 0.0800 | 0.0300 | 0.0000 | 0.0050 |
| 177 | Example | 0.9950 | 0.0000 | 0.0050 | 0.0600 | 0.0800 | 0.0300 | 0.0000 | 0.0050 |
| 178 | Example | 0.9900 | 0.0000 | 0.0100 | 0.0600 | 0.0800 | 0.0300 | 0.0000 | 0.0050 |
| 179 | Example | 0.9900 | 0.0000 | 0.0100 | 0.0600 | 0.0800 | 0.0300 | 0.0000 | 0.0050 |
| 180 | Example | 0.9850 | 0.0000 | 0.0150 | 0.0600 | 0.0800 | 0.0300 | 0.0000 | 0.0050 |
| 181 | Example | 0.9850 | 0.0000 | 0.0150 | 0.0600 | 0.0800 | 0.0300 | 0.0000 | 0.0050 |
| 182 | Example | 0.9800 | 0.0000 | 0.0200 | 0.0600 | 0.0800 | 0.0300 | 0.0000 | 0.0050 |
| 183 | Example | 0.9800 | 0.0000 | 0.0200 | 0.0600 | 0.0800 | 0.0300 | 0.0000 | 0.0050 |
| 184 | Example | 0.9800 | 0.0000 | 0.0200 | 0.0600 | 0.0800 | 0.0300 | 0.0000 | 0.0050 |
| 185 | Example | 0.9750 | 0.0000 | 0.0250 | 0.0600 | 0.0800 | 0.0300 | 0.0000 | 0.0050 |
| 186 | Example | 0.9700 | 0.0000 | 0.0300 | 0.0600 | 0.0800 | 0.0300 | 0.0000 | 0.0050 |
| 187 | Example | 0.9600 | 0.0000 | 0.0400 | 0.0600 | 0.0800 | 0.0300 | 0.0000 | 0.0050 |
| 188 | Example | 0.9450 | 0.0000 | 0.0550 | 0.0600 | 0.0800 | 0.0300 | 0.0000 | 0.0050 |
| 189 | Example | 0.9400 | 0.0000 | 0.0600 | 0.0600 | 0.0800 | 0.0300 | 0.0000 | 0.0050 |

| Sample No. | Example/Comparative Example | M | X2 | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|
| 1a | Example | Nb | — | 54 | 4.7 | 4.2 | 8.1 | 6.0 | A |
| 176 | Example | Nb | Al | 52 | 4.8 | 4.5 | 8.3 | 6.1 | A |
| 177 | Example | Nb | As | 51 | 5.3 | 5.0 | 8.4 | 6.1 | A |
| 178 | Example | Nb | Mn | 49 | 4.9 | 4.8 | 8.3 | 6.3 | A |
| 179 | Example | Nb | Sn | 53 | 5.2 | 5.2 | 8.6 | 6.0 | A |
| 180 | Example | Nb | Zn | 52 | 5.2 | 4.4 | 8.5 | 6.3 | A |
| 181 | Example | Nb | Ga | 52 | 5.4 | 4.6 | 8.2 | 6.1 | A |
| 182 | Example | Nb | Ag | 49 | 4.7 | 4.8 | 8.8 | 6.2 | A |
| 183 | Example | Nb | Sb | 49 | 4.9 | 5.0 | 8.7 | 6.4 | A |
| 184 | Example | Nb | Bi | 50 | 5.1 | 4.3 | 8.9 | 6.3 | A |
| 185 | Example | Nb | N | 52 | 5.0 | 4.1 | 8.4 | 6.5 | A |
| 186 | Example | Nb | S | 51 | 5.0 | 4.9 | 8.5 | 6.5 | A |
| 187 | Example | Nb | C | 49 | 5.2 | 4.9 | 8.5 | 6.2 | A |
| 188 | Example | Nb | Cr | 54 | 5.5 | 4.4 | 8.9 | 6.3 | A |
| 189 | Example | Nb | O | 53 | 5.3 | 4.7 | 8.4 | 6.6 | A |

TABLE 13B

| Sample No. | Example/Comparative Example | $(Fe_{(1-(\alpha+\beta))}X1_{\alpha}X2_{\beta})_{(1-(a+b+c+d+e))}M_aB_bP_cSi_dCu_e$ 1-(α + β) | α | β | a | b | c | d | e |
|---|---|---|---|---|---|---|---|---|---|
| 1a | Example | 1.0000 | 0.0000 | 0.0000 | 0.0600 | 0.0800 | 0.0300 | 0.0000 | 0.0050 |
| 190 | Example | 0.9700 | 0.0000 | 0.0300 | 0.0600 | 0.0800 | 0.0300 | 0.0000 | 0.0050 |
| 191 | Example | 0.9700 | 0.0000 | 0.0300 | 0.0600 | 0.0800 | 0.0300 | 0.0000 | 0.0050 |
| 192 | Example | 0.9700 | 0.0000 | 0.0300 | 0.0600 | 0.0800 | 0.0300 | 0.0000 | 0.0050 |
| 193 | Example | 0.9700 | 0.0000 | 0.0300 | 0.0600 | 0.0800 | 0.0300 | 0.0000 | 0.0050 |
| 194 | Example | 0.9700 | 0.0000 | 0.0300 | 0.0600 | 0.0800 | 0.0300 | 0.0000 | 0.0050 |
| 195 | Example | 0.9700 | 0.0000 | 0.0300 | 0.0600 | 0.0800 | 0.0300 | 0.0000 | 0.0050 |
| 196 | Example | 0.9700 | 0.0000 | 0.0300 | 0.0600 | 0.0800 | 0.0300 | 0.0000 | 0.0050 |
| 197 | Example | 0.9700 | 0.0000 | 0.0300 | 0.0600 | 0.0800 | 0.0300 | 0.0000 | 0.0050 |
| 198 | Example | 0.9700 | 0.0000 | 0.0300 | 0.0600 | 0.0800 | 0.0300 | 0.0000 | 0.0050 |
| 199 | Example | 0.9700 | 0.0000 | 0.0300 | 0.0600 | 0.0800 | 0.0300 | 0.0000 | 0.0050 |
| 186 | Example | 0.9700 | 0.0000 | 0.0300 | 0.0600 | 0.0800 | 0.0300 | 0.0000 | 0.0050 |
| 200 | Example | 0.9700 | 0.0000 | 0.0300 | 0.0600 | 0.0800 | 0.0300 | 0.0000 | 0.0050 |
| 201 | Example | 0.9700 | 0.0000 | 0.0300 | 0.0600 | 0.0800 | 0.0300 | 0.0000 | 0.0050 |
| 202 | Example | 0.9700 | 0.0000 | 0.0300 | 0.0600 | 0.0800 | 0.0300 | 0.0000 | 0.0050 |

TABLE 13B-continued

| Sample No. | Example/Comparative Example | M | X2 | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|
| 1a | Example | Nb | — | 54 | 4.7 | 4.2 | 8.1 | 6.0 | A |
| 190 | Example | Nb | Al | 52 | 5.0 | 4.4 | 8.3 | 6.1 | A |
| 191 | Example | Nb | As | 50 | 4.8 | 4.8 | 8.8 | 6.5 | A |
| 192 | Example | Nb | Mn | 51 | 4.8 | 4.3 | 9.0 | 6.3 | A |
| 193 | Example | Nb | Sn | 53 | 4.9 | 4.5 | 8.7 | 6.4 | A |
| 194 | Example | Nb | Zn | 54 | 5.1 | 4.7 | 8.6 | 6.4 | A |
| 195 | Example | Nb | Ga | 49 | 4.6 | 5.1 | 8.6 | 6.2 | A |
| 196 | Example | Nb | Ag | 51 | 5.2 | 4.9 | 8.4 | 6.1 | A |
| 197 | Example | Nb | Sb | 50 | 4.9 | 5.0 | 8.9 | 6.1 | A |
| 198 | Example | Nb | Bi | 49 | 5.0 | 4.8 | 9.2 | 6.0 | A |
| 199 | Example | Nb | N | 50 | 5.1 | 4.5 | 9.1 | 6.3 | A |
| 186 | Example | Nb | S | 51 | 5.0 | 4.9 | 8.5 | 6.5 | A |
| 200 | Example | Nb | C | 52 | 5.2 | 4.5 | 8.7 | 6.2 | A |
| 201 | Example | Nb | Cr | 51 | 4.8 | 5.0 | 8.8 | 6.4 | A |
| 202 | Example | Nb | O | 50 | 4.9 | 4.8 | 9.2 | 6.3 | A |

TABLE 13C

| Sample No. | Example/Comparative Example | $(Fe_{(1-(\alpha+\beta))}X1_{\alpha}X2_{\beta})_{(1-(a+b+c+d+e))}M_aB_bP_cSi_dCu_e$ 1-(α + β) | α | β | a | b | c | d | e |
|---|---|---|---|---|---|---|---|---|---|
| 1a | Example | 1.0000 | 0.0000 | 0.0000 | 0.0600 | 0.0800 | 0.0300 | 0.0000 | 0.0050 |
| 203 | Example | 0.9400 | 0.0000 | 0.0600 | 0.0600 | 0.0800 | 0.0300 | 0.0000 | 0.0050 |
| 204 | Example | 0.9400 | 0.0000 | 0.0600 | 0.0600 | 0.0800 | 0.0300 | 0.0000 | 0.0050 |
| 205 | Example | 0.9400 | 0.0000 | 0.0600 | 0.0600 | 0.0800 | 0.0300 | 0.0000 | 0.0050 |
| 206 | Example | 0.9400 | 0.0000 | 0.0600 | 0.0600 | 0.0800 | 0.0300 | 0.0000 | 0.0050 |
| 207 | Example | 0.9400 | 0.0000 | 0.0600 | 0.0600 | 0.0800 | 0.0300 | 0.0000 | 0.0050 |
| 208 | Example | 0.9400 | 0.0000 | 0.0600 | 0.0600 | 0.0800 | 0.0300 | 0.0000 | 0.0050 |
| 209 | Example | 0.9400 | 0.0000 | 0.0600 | 0.0600 | 0.0800 | 0.0300 | 0.0000 | 0.0050 |
| 210 | Example | 0.9400 | 0.0000 | 0.0600 | 0.0600 | 0.0800 | 0.0300 | 0.0000 | 0.0050 |
| 211 | Example | 0.9400 | 0.0000 | 0.0600 | 0.0600 | 0.0800 | 0.0300 | 0.0000 | 0.0050 |
| 212 | Example | 0.9400 | 0.0000 | 0.0600 | 0.0600 | 0.0800 | 0.0300 | 0.0000 | 0.0050 |
| 213 | Example | 0.9400 | 0.0000 | 0.0600 | 0.0600 | 0.0800 | 0.0300 | 0.0000 | 0.0050 |
| 214 | Example | 0.9400 | 0.0000 | 0.0600 | 0.0600 | 0.0800 | 0.0300 | 0.0000 | 0.0050 |
| 215 | Example | 0.9400 | 0.0000 | 0.0600 | 0.0600 | 0.0800 | 0.0300 | 0.0000 | 0.0050 |
| 189 | Example | 0.9400 | 0.0000 | 0.0600 | 0.0600 | 0.0800 | 0.0300 | 0.0000 | 0.0050 |

| Sample No. | Example/Comparative Example | M | X2 | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|
| 1a | Example | Nb | — | 54 | 4.7 | 4.2 | 8.1 | 6.0 | A |
| 203 | Example | Nb | Al | 53 | 4.6 | 4.7 | 8.3 | 6.3 | A |
| 204 | Example | Nb | As | 52 | 4.9 | 4.4 | 8.5 | 6.6 | A |
| 205 | Example | Nb | Mn | 52 | 4.9 | 4.9 | 8.3 | 6.3 | A |
| 206 | Example | Nb | Sn | 49 | 4.8 | 4.2 | 8.7 | 6.8 | A |
| 207 | Example | Nb | Zn | 51 | 5.1 | 5.0 | 9.0 | 6.1 | A |
| 208 | Example | Nb | Ga | 51 | 5.5 | 4.5 | 8.8 | 6.4 | A |
| 209 | Example | Nb | Ag | 49 | 4.8 | 4.5 | 8.8 | 6.0 | A |
| 210 | Example | Nb | Sb | 49 | 4.9 | 4.1 | 8.5 | 6.3 | A |
| 211 | Example | Nb | Bi | 50 | 5.3 | 5.0 | 8.4 | 6.6 | A |
| 212 | Example | Nb | N | 53 | 5.0 | 4.9 | 8.4 | 6.5 | A |
| 213 | Example | Nb | S | 52 | 5.0 | 5.2 | 8.9 | 6.5 | A |
| 214 | Example | Nb | C | 51 | 5.2 | 4.3 | 9.0 | 6.8 | A |
| 215 | Example | Nb | Cr | 49 | 4.7 | 4.4 | 9.1 | 6.6 | A |
| 189 | Example | Nb | O | 53 | 5.3 | 4.7 | 8.4 | 6.6 | A |

TABLE 13D

| Sample No. | Example/Comparative Example | 1-(α + β) | α | β | a | b | c | d | e |
|---|---|---|---|---|---|---|---|---|---|
| | | $(Fe_{(1-(\alpha+\beta))}X1_{\alpha}X2_{\beta})_{(1-(a+b+c+d+e))}M_aB_bP_cSi_dCu_e$ | | | | | | | |
| 1a | Example | 1.0000 | 0.0000 | 0.0000 | 0.0600 | 0.0800 | 0.0300 | 0.0000 | 0.0050 |
| 216 | Example | 0.9950 | 0.0000 | 0.0050 | 0.0600 | 0.0800 | 0.0300 | 0.0000 | 0.0050 |
| 217 | Example | 0.9900 | 0.0000 | 0.0100 | 0.0600 | 0.0800 | 0.0300 | 0.0000 | 0.0050 |
| 218 | Example | 0.9850 | 0.0000 | 0.0150 | 0.0600 | 0.0800 | 0.0300 | 0.0000 | 0.0050 |
| 219 | Example | 0.9800 | 0.0000 | 0.0200 | 0.0600 | 0.0800 | 0.0300 | 0.0000 | 0.0050 |
| 220 | Example | 0.9750 | 0.0000 | 0.0250 | 0.0600 | 0.0800 | 0.0300 | 0.0000 | 0.0050 |
| 221 | Example | 0.9700 | 0.0000 | 0.0300 | 0.0600 | 0.0800 | 0.0300 | 0.0000 | 0.0050 |
| 187 | Example | 0.9600 | 0.0000 | 0.0400 | 0.0600 | 0.0800 | 0.0300 | 0.0000 | 0.0050 |
| 222 | Example | 0.9450 | 0.0000 | 0.0550 | 0.0600 | 0.0800 | 0.0300 | 0.0000 | 0.0050 |
| 223 | Example | 0.9400 | 0.0000 | 0.0600 | 0.0600 | 0.0800 | 0.0300 | 0.0000 | 0.0050 |

| Sample No. | Example/Comparative Example | M | X2 | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|---|
| 1a | Example | Nb | — | 54 | 4.7 | 4.2 | 8.1 | 6.0 | A |
| 216 | Example | Nb | C | 53 | 4.6 | 5.0 | 8.3 | 6.0 | A |
| 217 | Example | Nb | C | 52 | 5.0 | 4.9 | 9.0 | 6.2 | A |
| 218 | Example | Nb | C | 51 | 4.7 | 4.8 | 8.7 | 6.1 | A |
| 219 | Example | Nb | C | 49 | 5.1 | 4.7 | 8.9 | 6.0 | A |
| 220 | Example | Nb | C | 53 | 4.8 | 5.1 | 8.5 | 6.3 | A |
| 221 | Example | Nb | C | 52 | 5.0 | 4.9 | 8.7 | 6.1 | A |
| 187 | Example | Nb | C | 49 | 5.2 | 4.9 | 8.5 | 6.2 | A |
| 222 | Example | Nb | C | 50 | 5.1 | 5.0 | 9.1 | 6.0 | A |
| 223 | Example | Nb | C | 51 | 4.9 | 4.6 | 8.8 | 6.2 | A |

From Tables 13A to 13D, all of the sample Nos. 176 to 223 newly carried out in Experimental Example 6 had good temperature properties of core loss.

Experimental Example 7

(Sample Nos. 1p-1 and 1p-2)

Various raw metals or the like were weighed so as to obtain a base alloy having a composition of $Fe_{0.820}Nb_{0.060}B_{0.090}P_{0.030}$ in an atomic number ratio. Then, the chamber was vacuum-evacuated and the raw metals were then melted by high frequency heating to prepare the base alloy.

Then, the prepared base alloy was heated and melted to obtain a metal in a molten state at 1500° C., and then the metal was made into a powder by a gas atomization method by filling the chamber with argon whose dew point was adjusted at a gas heating temperature of 30° C. and setting a vapor pressure in the chamber to 1 hPa. In addition, the obtained soft magnetic metal powder was classified by sieving so that an average grain size (D50) of the soft magnetic metal powder was 24 μm.

Then, the obtained powder is heat-treated under heat treatment conditions shown in Table 14.

It was confirmed by an X-ray diffractometer (XRD) that the powder obtained after the heat treatment includes a crystallite of α-Fe. Further, the powder was observed using a transmission electron microscope (TEM). In the observation using the TEM, a magnification was $1.00\times10^5$ to $3.00\times10^5$ times, and a size of an observation range was 128 nm×128 nm. A TEM sample was prepared using FIB so as to have a thickness of 20 nm. The thickness of the TEM sample was confirmed by electron energy-loss spectroscopy (EELS). By observation using the TEM, a total area ratio of the crystallite, an average thickness of an amorphous phase, and a standard deviation of a thickness of the amorphous phase were calculated.

It was confirmed by ICP analysis that a composition of the obtained powder after the heat treatment and a composition of the base alloy did not change.

Next, a magnetic core (toroidal core) was prepared using the powder of the prepared soft magnetic alloy. First, a phenol resin serving as an insulating binder was mixed with each powder so that an amount of the phenol resin was 3% by mass of a total amount. Next, using a general planetary mixer as a stirrer, the mixture was granulated so as to obtain a granulated powder of about 500 μm. Next, the obtained granulated powder was molded at a surface pressure of 4 ton/cm$^2$ (392 MPa) to prepare a toroidal molded body having an outer diameter of 18 mm, an inner diameter of 10 mm, and a height of 6.0 mm. The obtained molded body was cured at 150° C. to prepare the toroidal core.

Further, a temperature property of core loss was evaluated for the obtained toroidal core. Specifically, the temperature property of the core loss was measured at temperatures of −30° C., −10° C., 0° C., 10° C., 30° C., 50° C., 80° C., 100° C., 120° C., and 140° C. under conditions of a measurement frequency of 600 kHz and a maximum magnetic flux density of 60 mT, using a BH analyzer [SY8217 manufactured by IWATSU TEST INSTRUMENTS CORPORATION]. Then, for the core loss at each temperature, a change rate of the core loss at 30° C. was calculated. An absolute value of the change rate in the core loss when the absolute value of the change rate in the core loss is the largest was taken as a maximum change rate in the core loss. Results are shown in Table 14. Evaluation criteria were the same as those in Experimental Example 1.

For comparison, Table 14 shows a result of the sample No. 1 carried out under substantially the same conditions as the sample No. 1p-2 except that an alloy shape is a ribbon shape.

(Sample Nos. 127p-1 and 127p-2)

Various raw metals or the like were weighed so as to obtain a base alloy having a composition of $(Fe_{0.800}Co_{0.200})_{0.825}Nb_{0.060}B_{0.080}P_{0.030}Cu_{0.005}$ in an atomic number ratio. Then, the chamber was vacuum-evacuated and the raw metals were then melted by the high frequency heating to prepare the base alloy.

The sample No. 127p-1 was the same as the sample No. 1p-1 except for $T_{1st}$ in subsequent steps. The sample No. 127p-2 was the same as the sample No. 1p-2 except for $T_{1st}$ in the subsequent steps. Results are shown in Table 14.

For comparison, Table 14 shows a result of the sample No. 127 carried out under substantially the same conditions as the sample No. 127p-2 except that the alloy shape is the ribbon shape.

TABLE 14

| Sample No. | Example/Comparative Example | Alloy shape | Heat treatment condition: First stage $T_{1st}$ ° C. | First stage Retention time min | Second stage $T_{2nd}$ ° C. | Second stage Retention time min | Third stage $T_{3rd}$ ° C. | Third stage Retention time min | Room temperature to $T_{1st}$ heating rate ° C./min | $T_{1st}$ to $T_{2nd}$ heating rate ° C./min |
|---|---|---|---|---|---|---|---|---|---|---|
| 1 | Example | ribbon | 490 | 60 | 550 | 60 | 600 | 60 | 10 | 10 |
| 1p-1 | Comparative Example | powder | 490 | 60 | — | — | — | — | 10 | — |
| 1p-2 | Example | powder | 490 | 60 | 550 | 60 | 600 | 60 | 10 | 10 |
| 127 | Example | ribbon | 450 | 60 | 550 | 60 | 600 | 60 | 10 | 10 |
| 127p-1 | Comparative Example | powder | 450 | 60 | — | — | — | — | 10 | — |
| 127p-2 | Example | powder | 450 | 60 | 550 | 60 | 600 | 60 | 10 | 10 |

| Sample No. | Example/Comparative Example | $T_{2nd}$ to $T_{3rd}$ heating rate ° C./min | Area ratio of crystallite % | Average thicknes of amorphous phase nm | Standard deviation of thickness of amorphous phase nm | Average grain size of crystallite nm | Maximum change rate in core loss % | Temperature property of core loss |
|---|---|---|---|---|---|---|---|---|
| 1 | Example | 10 | 49 | 6.9 | 6.1 | 12.9 | 3.2 | A+ |
| 1p-1 | Comparative Example | — | 29 | 13.9 | 14.5 | 2.8 | 123.3 | D |
| 1p-2 | Example | 10 | 50 | 6.5 | 6.7 | 11.8 | 3.5 | A+ |
| 127 | Example | 10 | 55 | 4.7 | 3.9 | 8.7 | 2.1 | A+ |
| 127p-1 | Comparative Example | — | 31 | 14.3 | 12.4 | 3.7 | 103.5 | D |
| 127p-2 | Example | 10 | 54 | 4.5 | 4.2 | 8.3 | 2.7 | A+ |

From Table 14, in the sample Nos. 1p-1 and 127p-1 newly carried out in Experimental Example 7, since the heat treatment conditions were inappropriate, the total area ratio of the crystallite, the average thickness of the amorphous phase, and the standard deviation of the thickness of the amorphous phase were out of predetermined ranges. As a result, the temperature properties of core loss deteriorated. In addition, the sample Nos. 1p-2 and 127p-2, which were heat-treated at three stages, were appropriately heat-treated, and thus the total area ratio of the crystallite, the average thickness of the amorphous phase, and the standard deviation of the thickness of the amorphous phase were out of the predetermined ranges. As a result, the temperature properties of the core loss were good.

DESCRIPTION OF THE REFERENCE NUMERAL

1 soft magnetic alloy
11 crystallite
13 amorphous phase
31 nozzle
32 molten metal
33 roll
34 soft magnetic alloy ribbon
35 chamber

What is claimed is:

1. A soft magnetic alloy, comprising Fe and M, wherein M is one or more of Nb, Hf, Zr, Ta, Mo, V, Ti, and W, a total content of M is 3.5 at % or more and 10.0 at % or less, the soft magnetic alloy includes a crystallite, and an amorphous phase existing around the crystallite, a total area ratio of the crystallite in a cross section of the soft magnetic alloy is 40% or more and less than 60%, and an average thickness of the amorphous phase is 4.0 nm or more and 10.0 nm or less, and a standard deviation of a thickness of the amorphous phase is 10.0 nm or less.

2. The soft magnetic alloy according to claim 1, wherein an average grain size of the crystallite is 15.0 nm or less.

3. The soft magnetic alloy according to claim 1, further comprising P, wherein P content is more than 0 and 6.0 at % or less.

4. The soft magnetic alloy according to claim 1, further comprising Cu, wherein Cu content is more than 0 and 3.0 at % or less.

5. The soft magnetic alloy according to claim 1, further comprising Co, wherein Co content is more than 0 and equal to or less than Fe content.

6. A soft magnetic alloy ribbon, comprising the soft magnetic alloy according to claim 1.

7. A magnetic component, comprising the soft magnetic alloy ribbon according to claim 6, which is laminated.

8. A magnetic component, comprising the soft magnetic alloy ribbon according to claim 6, which is wound.

9. A soft magnetic alloy powder, comprising the soft magnetic alloy according to claim 1.

10. A magnetic component, comprising the soft magnetic alloy powder according to claim 9.

* * * * *